(12) United States Patent
Hisada et al.

(10) Patent No.: US 7,047,545 B2
(45) Date of Patent: *May 16, 2006

(54) OPTICAL DISK, METHOD FOR PRODUCING THE SAME, AND APPARATUS FOR PRODUCING THE SAME

(75) Inventors: Kazuya Hisada, Osaka (JP); Kazuhiro Hayashi, Neyagawa (JP); Kazuo Inoue, Osaka (JP); Eiji Ohno, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 102 days.

This patent is subject to a terminal disclaimer.

(21) Appl. No.: 10/639,924

(22) Filed: Aug. 13, 2003

(65) Prior Publication Data
US 2004/0033329 A1   Feb. 19, 2004

Related U.S. Application Data

(62) Division of application No. 09/843,273, filed on Apr. 25, 2001, now Pat. No. 6,743,527.

(30) Foreign Application Priority Data

Apr. 25, 2000 (JP) .............................. 2000-124220
Oct. 5, 2000 (JP) .............................. 2000-305816

(51) Int. Cl.
*G11B 7/24* (2006.01)

(52) U.S. Cl. .................................................. 720/718

(58) Field of Classification Search ................. 720/718
See application file for complete search history.

(56) References Cited

U.S. PATENT DOCUMENTS

| | | | |
|---|---|---|---|
| 6,041,031 A | 3/2000 | Ichimura et al. | 369/112.01 |
| 6,309,485 B1 | 10/2001 | Miyamoto et al. | |
| 6,743,527 B1 * | 6/2004 | Hisada et al. | 428/694 SC |

FOREIGN PATENT DOCUMENTS

| | | |
|---|---|---|
| CN | 1193161 | 9/1998 |
| JP | 61-51632 | 3/1986 |
| JP | 9-185845 | 7/1997 |
| JP | 10-283683 | 10/1998 |
| JP | 11-53769 | 2/1999 |
| JP | 2000-67468 | 3/2000 |
| WO | 97/40494 | 10/1997 |

* cited by examiner

*Primary Examiner*—George Letscher
(74) *Attorney, Agent, or Firm*—Hamre, Schumann, Mueller & Larson, P.C.

(57) ABSTRACT

An optical disk of the present invention includes a first substrate having a signal area on a principal plane and a central hole, and a second substrate that is transparent and attached to the first substrate. The second substrate is thinner than the first substrate, and has a central hole whose diameter is larger than that of the first substrate. The first substrate and the second substrate are attached to each other with radiation curable resin (adhesive member) disposed therebetween so as to extend at least from an inner peripheral edge of the second substrate to an outer peripheral edge thereof.

40 Claims, 24 Drawing Sheets

OPTICAL DISK, METHOD FOR PRODUCING THE SAME, AND APPARATUS FOR PRODUCING THE SAME

BACKGROUND OF THE INVENTION

1. Field of the Invention

The present invention relates to an optical disk and a method for producing the same. In particular, the present invention relates to an optical disk in which a substrate on an incident side of laser light is thinner, and a method for producing the same.

2. Description of the Related Art

In recent years, various studies have been conducted on the recording of optical information in the field of information recording. Recording of optical information can be conducted at higher density, and optical information can be recorded/reproduced in a non-contact manner; therefore, as a method for realizing the recording/reproducing of optical information at a low cost, applications for use in a wide range are being realized. Examples of current optical disks include those having a structure in which an information layer is provided on a transparent resin substrate with a thickness of 1.2 mm and protected by an overcoat or those having a structure in which an information layer is provided on one side or both sides of a transparent resin substrate with a thickness of 0.6 mm, and two substrates are attached to each other.

Recently, in order to increase the recording density of an optical disk, a method for increasing a numerical aperture (NA) of an objective lens, a method for shortening a wavelength of the laser to be used, and the like have been considered. As the thickness of a recording/reproducing side substrate (i.e., substrate on an incident side of laser light) becomes smaller, the influence of aberration on a laser spot can be decreased, and an allowable value of a tilt of a disk can be increased. Because of this, it is proposed that the thickness of a recording/reproducing side substrate, a NA, and a laser wavelength are prescribed to be about 0.1 mm, about 0.85, and about 400 nm, respectively.

In a current DVD (digital versatile disk), mainly, a method is used in which two transparent resin substrates (thickness: 0.6 mm), on which film formation and the like are conducted, are attached, with radiation curable resin. Even when the thickness of a recording/reproducing side substrate becomes about 0.1 mm for the purpose of achieving high density, it is desirable to attach substrates to each other by the same method using the same facility as those currently used.

However, with an optical disk in which two substrates are attached to each other, it is necessary to enhance durability. Furthermore, when the centers of two substrates are shifted from each other, deflections occur when the optical disk is rotated. Therefore, it is required to align the centers of two substrates with each other with high precision. There also is a demand for a method for easily producing such optical disks.

SUMMARY OF THE INVENTION

Therefore, with the foregoing in mind, it is an object of the present invention to provide an optical disk that is recordable at high density by attaching two substrates to each other, and a method for producing the same.

In order to achieve the above-mentioned object, an optical disk of the present invention includes a first substrate having a signal area on a principal plane and a central hole A and a second substrate that is transparent and attached to the first substrate, wherein the second substrate is thinner than the first substrate and has a central hole B whose diameter is larger than that of the central hole A, and the first substrate and the second substrate are attached to each other with an adhesive member disposed therebetween so as to extend at least from an inner peripheral edge of the second substrate to an outer peripheral edge thereof.

According to the above-mentioned configuration, an easy-to-handle optical disk is obtained that is capable of conducting high-density recording. Because of this, when a disk is handled, cracking or peeling of a contact portion can be prevented. The term "radiation" used herein includes a particle wave such as an electron beam and ultraviolet-rays and an electromagnetic wave.

In the above-mentioned optical disk, the adhesive member may be radiation curable resin. According to this configuration, an optical disk can be produced easily.

In the above-mentioned optical disk, a thickness of the second substrate may be in a range of 0.03 mm to 0.3 mm. According to this configuration, in particular, an optical disk that is recordable at high density can be obtained.

In the above-mentioned optical disk, the central hole B may be larger than a clamp area of the optical disk. According to this configuration, an optical disk can be fixed stably. Furthermore, when an optical disk is clamped, the second substrate can be prevented from peeling.

In the above-mentioned optical disk, the adhesive member may be disposed on an outer peripheral side of a clamp area or disposed so as to cover the entire clamp area. According to this configuration, since a thickness of the clamp area can be rendered uniform, a tilt is prevented from occurring during recording/reproduction.

In the above-mentioned optical disk, a thickness of a clamp area of the first substrate may be in a range of 1.1 mm to 1.3 mm.

In the above-mentioned optical disk, the first substrate includes, on the principal plane, at least one selected from the group consisting of a convex portion formed in a circular shape so as to surround the central hole A and having an outer diameter equal to or smaller than a diameter of the central hole B, and a concave portion formed in a circular shape so as to surround the central hole A and having a diameter equal to or smaller than the diameter of the central hole B.

In the above-mentioned optical disk, a height of the convex portion may be larger than a sum of a thickness of the second substrate and a thickness of the adhesive member.

In the above-mentioned optical disk, an average thickness of the adhesive member may be in a range of 0.5 µm to 30 µm.

In the above-mentioned optical disk, the optical disk is adapted for reproduction of information by application of a laser having a wavelength of 450 nm or less. According to this configuration, in particular, information can be recorded at high density.

Furthermore, a first method for producing an optical disk of the present invention including a first substrate having a central hole A and a second substrate that is transparent and has a central hole B whose diameter is larger than that of the central hole A includes the processes of: (a) bringing the first substrate having a signal area on a principal plane and the second substrate that is thinner than the first substrate into contact with each other with radiation curable resin interposed therebetween so that the principal plane faces inside; and (b) irradiating the radiation curable resin with radiation to cure the radiation curable resin, thereby attaching the first substrate to the second substrate, wherein, in the process (a), the radiation curable resin is disposed so as to extend at least from an inner peripheral edge of the second substrate to an outer peripheral edge thereof.

According to the first production method, an easy-to-handle optical disk that is recordable at high-density can be produced easily.

In the first production method, a thickness of the second substrate may be in a range of 0.03 mm to 0.3 mm.

In the first production method, the process (a) may include interposing the radiation curable resin between the first and second substrates, and rotating the first and second substrates to draw the radiation curable resin. According to this configuration, the thickness of resin easily can be rendered uniform.

In the first production method, the process (a) may include pouring the radiation curable resin onto the first substrate, rotating the first substrate to coat the first substrate with the radiation curable resin, and bringing the first substrate and the second substrate into contact with each other with the radiation curable resin interposed therebetween.

In the first production method, in the process (a), the first substrate and the second substrate are brought into contact with each other in a vacuum atmosphere. According to this configuration, air bubbles can be prevented from entering between the first substrate and the second substrate. The term "vacuum atmosphere" as used here refers to an atmosphere with a reduced pressure (e.g., an atmosphere of 1000 Pa or less).

In the first production method, the first substrate may include, on the principal plane, at least one selected from the group consisting of a convex portion formed in a circular shape so as to surround the central hole A and having an outer diameter equal to or smaller than a diameter of the central hole B, and a concave portion formed in a circular shape so as to surround the central hole A and having a diameter equal to or smaller than that of the central hole B.

In the first production method, a height of the convex portion may be larger than a sum of a thickness of the second substrate and a thickness of the radiation curable resin.

Furthermore, a second method for producing an optical disk of the present invention includes the processes of: (A) bringing a first substrate having a signal area on a principal plane and a central hole A and a second substrate that is transparent and thinner than the first substrate into contact with each other with radiation curable resin interposed therebetween so that the principal plane faces inside; (B) irradiating the radiation curable resin with radiation to cure the radiation curable resin, thereby attaching the first substrate to the second substrate; and (C) removing a part of the second substrate to form a central hole B whose diameter is larger than that of the central hole A in the second substrate, wherein, in the process (A), the radiation curable resin is disposed so as to extend at least from an outer periphery of a position where the central hole B is formed to an outer peripheral edge of the second substrate.

According to the second production method, an easy-to-handle optical disk that is recordable at high density can be produced.

In the second production method, a thickness of the second substrate may be in a range of 0.03 mm to 0.3 mm.

In the second production method, the process (A) may include interposing the radiation curable resin between the first and second substrates, and rotating the first and second substrates to draw the radiation curable resin.

In the second production method, the process (A) may include pouring the radiation curable resin onto the first substrate, rotating the first substrate to coat the first substrate with the radiation curable resin, and bringing the first substrate and the second substrate into contact with each other with the radiation curable resin interposed therebetween.

In the second production method, in the process (A), the first substrate and the second substrate are brought into contact with each other in a vacuum atmosphere.

Furthermore, a third method for producing an optical disk of the present invention includes the processes of: (i) opposing a first substrate in which a central hole A with a diameter dA is formed to a second substrate in which a central hole B with a diameter dB is formed with radiation curable resin interposed therebetween so that a center of the first substrate is aligned with a center of the second substrate; and (ii) irradiating the radiation curable resin with radiation to cure the radiation curable resin, wherein dA<dB, and a thickness of the second substrate is in a range of 0.03 mm to 0.3 mm.

According to the above-mentioned configuration, an optical disk that is recordable at high density can be produced with good precision.

In the third production method, in the process (i), the center of the first substrate is aligned with the center of the second substrate by using a pin that fits in the first and second central holes A and B. According to this configuration, it is easy to align the center of the first substrate with the center of the second substrate. As a result, an optical disk can be obtained in which deflections are unlikely to occur even when the optical disk is rotated at a high speed during recording/reproduction.

In the third production method, the process (i) may include the processes of: (i-1) fixing the second substrate on a table in which the pin is disposed so that the pin is inserted into the central hole B; (i-2) pouring the radiation curable resin onto the second substrate; (i-3) moving the first substrate so that the pin is inserted into the central hole A, thereby opposing the first substrate to the second substrate with the radiation curable resin interposed therebetween; and (i-4) rotating the first and second substrates to draw the radiation curable resin. According to this configuration, the thickness of the radiation curable resin can be rendered uniform. Therefore, an optical disk with good productivity and reliability can be produced.

In the third production method, the pin may include a first pin that fits in the central hole A and a second pin that fits in the central hole B, in the process (i-1), the second substrate may be fixed with the second pin, and in the process (i-3), the first substrate may be fixed with the first pin.

The third production method may include, after the process (i-1) and before the process (i-2), lowering an upper surface of the second pin below an upper surface of the second substrate.

In the third production method, the second pin may have a cylindrical shape, and the first pin may be inserted into the second pin.

Furthermore, a fourth method for producing an optical disk of the present invention is a method for producing an optical disk including a first substrate in which a central hole A with a diameter dA is formed and a second substrate in which a central hole B with a diameter dB is formed, including the processes of: (I) coating at least one substrate selected from the group consisting of the first substrate and the second substrate with radiation curable resin; (II) opposing the first substrate to the second substrate with the radiation curable resin interposed therebetween in a vacuum atmosphere so that a center of the first substrate is aligned with a center of the second substrate; and (III) irradiating the radiation curable resin with radiation to cure the radiation curable resin, wherein dA<dB, and a thickness of the second substrate is in a range of 0.03 mm to 0.3 mm.

According to the fourth production method, an optical disk that is recordable at high density can be produced. Furthermore, the first substrate and the second substrate are opposed to each other in vacuum, so that air bubbles can be prevented from entering therebetween.

In the fourth production method, in the process (II), the center of the first substrate is aligned with the center of the second substrate by using a pin that fits in the first and second central holes A and B. According to this configuration, it is easy to align the center of the first substrate with the center of the second substrate.

In the fourth production method, the process (II) may include the processes of: (II-1) fixing the second substrate on a table in which the pin is disposed so that the pin is inserted into the central hole B; and (II-2) in a vacuum atmosphere, moving the first substrate so that the pin is inserted into the central hole A, thereby opposing the first substrate to the second substrate with the radiation curable resin interposed therebetween. According to this configuration, by fixing a second thin substrate on a table, the surface of the second substrate can be rendered flat; as a result, the thickness of the radiation curable resin can be rendered uniform. Furthermore, according to this configuration, air bubbles can be prevented from entering between the first substrate and the second substrate.

In the fourth production method, the pin may include a first pin that fits in the central hole A and a second pin that fits in the central hole B, in the process (II-1), the second substrate may be fixed with the second pin, and in the process (II-2), the first substrate may be fixed with the first pin.

The fourth production method further may include, after the process (II-1) and before the process (II-2), lowering an upper surface of the second pin below an upper surface of the second substrate.

In the fourth production method, the second pin may have a cylindrical shape, and the first pin may be inserted into the second pin.

Furthermore, a production apparatus of the present invention is an apparatus for producing an optical disk including a first substrate in which a central hole A is formed and a second substrate in which a central hole B is formed, including: a coating member for coating at least one substrate selected from the group consisting of the first substrate and the second substrate with radiation curable resin; a disposing member for disposing the first substrate and the second substrate so that a center of the first substrate is aligned with a center of the second substrate; and an irradiating member for irradiating the radiation curable resin with radiation.

According to the above-mentioned apparatus for producing an optical disk, the third and fourth production methods of the present invention can be conducted easily.

In the above-mentioned production apparatus, the disposing member may include a pin that fits in the first and second central holes A and B.

In the above-mentioned production apparatus, the pin may include a first pin that fits in the central hole A and a second pin that fits in the central hole B.

In the above-mentioned production apparatus, the second pin may have a cylindrical shape, and the first pin may be inserted into the second pin.

In the above-mentioned production apparatus, the disposing member may include a table for fixing the at least one substrate.

In the above-mentioned production apparatus, the disposing member further may include a container surrounding the table and an exhaust member for exhausting the container.

These and other advantages of the present invention will become apparent to those skilled in the art upon reading and understanding the following detailed description with reference to the accompanying figures.

DESCRIPTION OF THE PREFERRED EMBODIMENTS

Figure 1A:
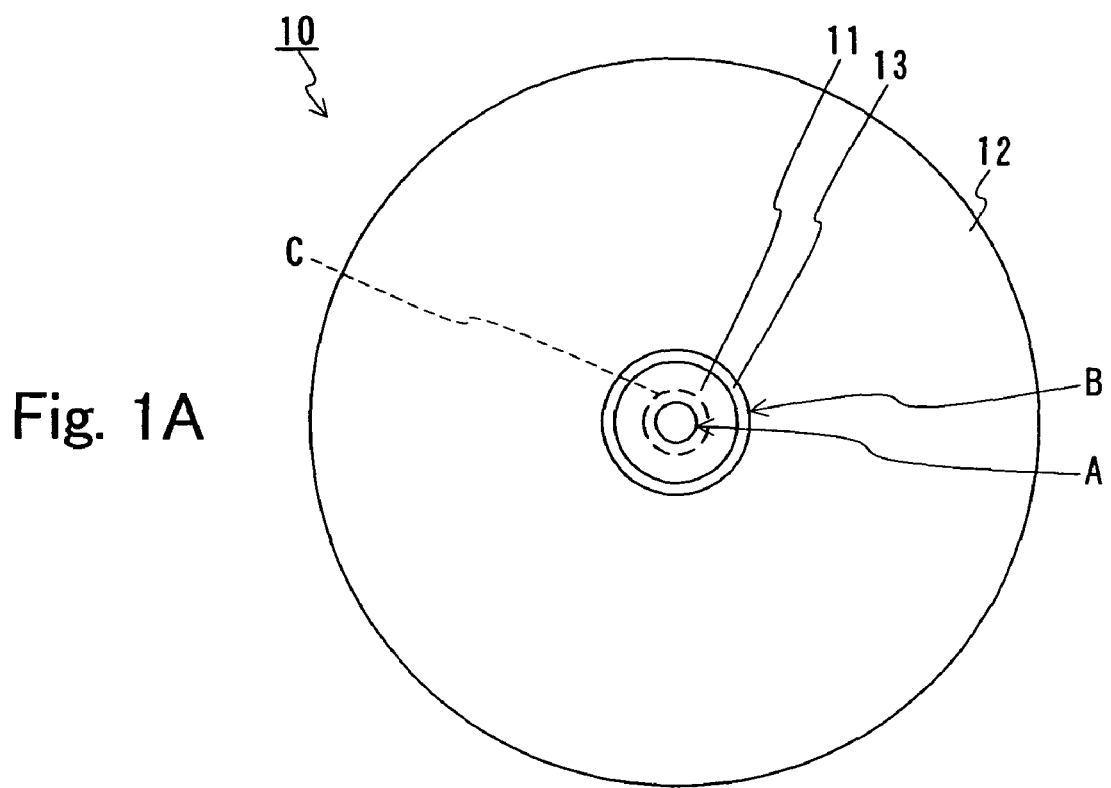
FIGS. 1A and 1B are a plan view and a cross-sectional view showing an example of an optical disk of the present invention.

Hereinafter, the present invention will be described by way of illustrative embodiments with reference to the drawings. Like components are denoted with like reference numerals. The repeated description of the components may be omitted.

Embodiment 1

Figure 1B:
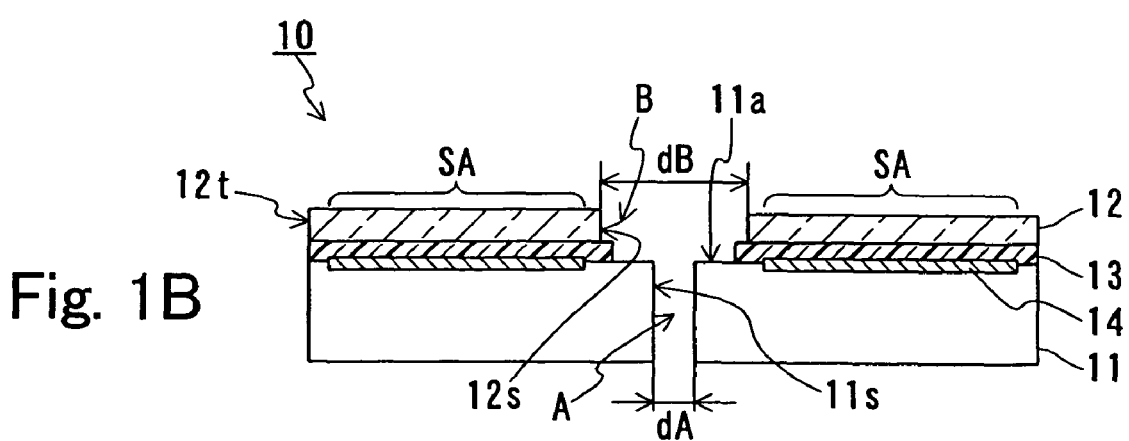

In Embodiment 1, the present invention will be described by way of an example of an optical disk. FIGS. 1A and 1B are a plan view and a cross-sectional view of an optical disk 10 of Embodiment 1, respectively.

Referring to FIGS. 1A and 1B, the optical disk 10 includes a first substrate 11 (hatching is omitted; hereinafter, hatching of the first substrate similarly may be omitted), and a second substrate 12 attached to the first substrate 11. The first substrate 11 and the second substrate 12 are attached to each other with radiation curable resin (adhesive member) 13 disposed therebetween.

The first substrate 11 has a signal area SA on a principal plane 11a. A signal recording layer 14 is formed in the signal area SA. The structure of the signal area SA is varied depending upon the use of an optical disk. In the case where the optical disk 10 is a read-only disk, for example, pits with unevenness are formed in the signal area SA on the principal plane 11a, and a film made of Al or the like is formed on the pits as a signal recording layer. Furthermore, in the case where the optical disk 10 is a recording/reproducing disk, a recording film composed of a phase-change material, a colorant, and the like is formed in the signal area SA so that recording/reproduction can be conducted.

The first substrate 11 has a circular central hole A with a diameter dA (e.g., 15 mm) at its center. The thickness of the first substrate 11 is not particularly limited. However, it is preferable that the sum of thickness of the first and second substrates 11 and 12 is in a range of 0.5 mm to 0.7 mm or 1.1 mm to 1.3 mm. The outer diameter of the first substrate 11 is not particularly limited, and it may be, for example, 120 mm. The first substrate 11 is made of, for example, thermoplastic resin such as polycarbonate resin and acrylic resin, or thermosetting resin such as vinylester resin and polyester resin.

The second substrate 12 is thinner than the first substrate 11 and transparent. The thickness of the second substrate 12 is in a range of preferably 0.03 mm to 0.3 mm, more preferably 0.03 mm to 0.12 mm. More specifically, the thickness of the second substrate 12 is, for example, 0.05 mm or 0.1 mm. By prescribing the sum of thickness of the first substrate 11 and the second substrate 12 in a range of 1.1 mm to 1.3 mm, the compatibility with respect to existing optical disks can be ensured. Furthermore, by prescribing the sum of thickness in a range of 0.5 mm to 0.7 mm or 1.1 mm to 1.3 mm, a conventional apparatus for producing an optical disk can be used.

The second substrate 12 is exposed to laser light (wavelength: preferably 450 nm or less) for recording/reproducing a signal, and is made of transparent material. More specifically, the second substrate 12 is made of thermoplastic resin such as polycarbonate resin and acrylic resin, or thermosetting resin such as vinylester resin and polyester resin. The second substrate 12 has a circular central hole B with a diameter dB. As shown in FIG. 1A, the central hole B preferably is larger than a clamp area C.

Herein, the clamp area C is held when the optical disk 10 is transported or rotated for the purpose of recording/reproduction. It is preferable that the thickness of the clamp area C of the first substrate 11 is in a range of 1.1 mm to 1.3 mm.

The radiation curable resin 13 that is an adhesive member is disposed so as to extend at least from an inner peripheral edge 12s of the second substrate 12 to an outer peripheral edge 12t thereof. More specifically, the radiation curable resin 13 extends at least over the entire surface of the principal plane of the second substrate 12 on the first substrate 11 side. The radiation curable resin 13 may extend up to the inner peripheral edge 11s of the first substrate 11. The radiation curable resin 13 is cured with radiation. As the radiation curable resin 13, for example, UV-curable resin that is cured with ultraviolet radiation, resin that is cured with an electron beam, and the like can be used. It is preferable that the radiation curable resin 13 is disposed on an outer side of the clamp area C, as shown in FIG. 1A, or disposed so as to cover the entire clamp area C. It is preferable that the average thickness of the radiation curable resin 13 is in a range of 0.5 µm to 30 µm. An adhesive member such as a double-faced tape may be used in place of the radiation curable resin 13.

In the optical disk 10 of Embodiment 1, since the second substrate 12 on a light incident side is thinner, high-density recording can be conducted. Furthermore, the diameter of the central hole B of the second substrate 12 is larger than that of the central hole A of the first substrate 11. Therefore, peeling and cracking of the second substrate 12 are unlikely to occur, and an optical disk thus obtained can be handled easily. Furthermore, since the radiation curable resin 13 extends up to the inner peripheral edge 12s of the second substrate 12, peeling and cracking of the second substrate 12 are unlikely to occur, and an optical disk thus obtained can be handled easily.

It is preferable that the first substrate 11 has, on the principal plane 11a side, at least one selected from a convex portion formed in a circular shape so as to surround the central hole A and having an outer diameter equal to or smaller than a diameter of the central hole B, and a concave portion formed in a circular shape so as to surround the central hole A and having a diameter equal to or smaller than a diameter of the central hole B.

Figure 2A:
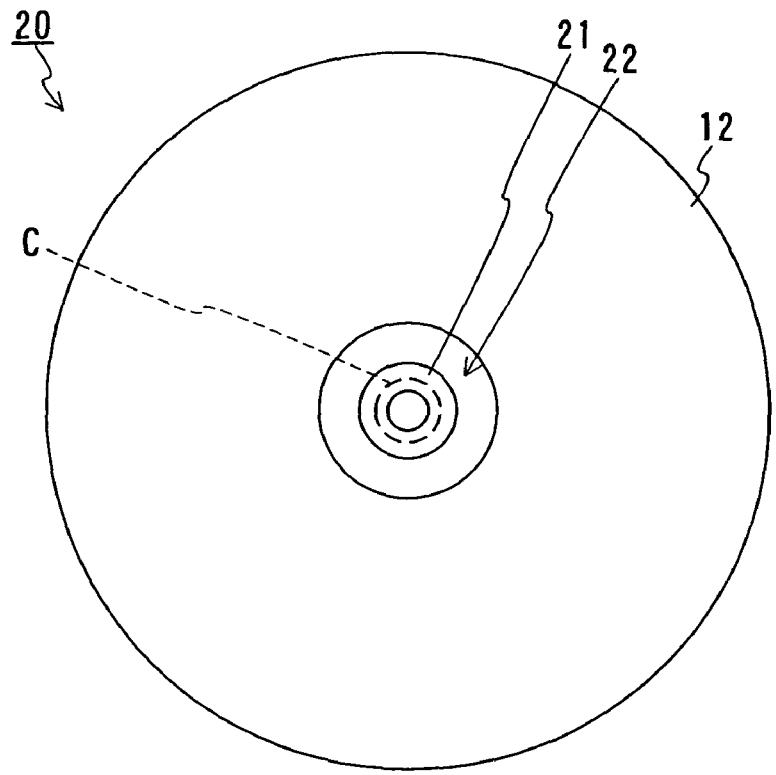
FIGS. 2A and 2B are a plan view and a cross-sectional view showing another example of an optical disk of the present invention.
Figure 2B:
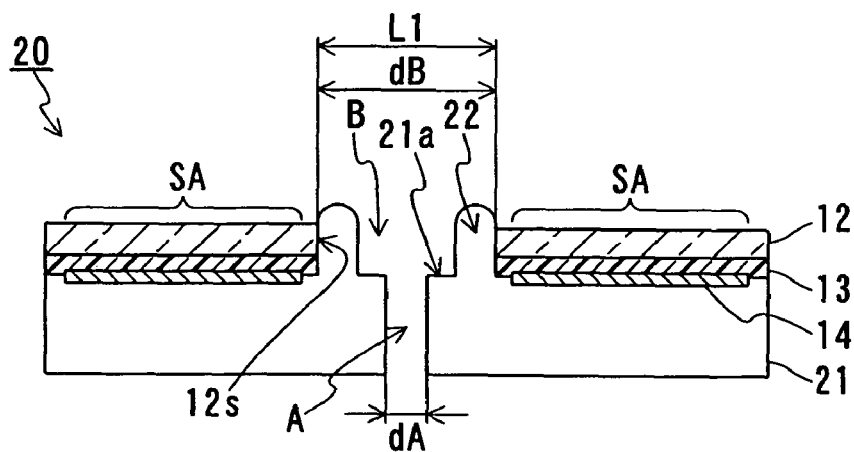
Figure 3A:
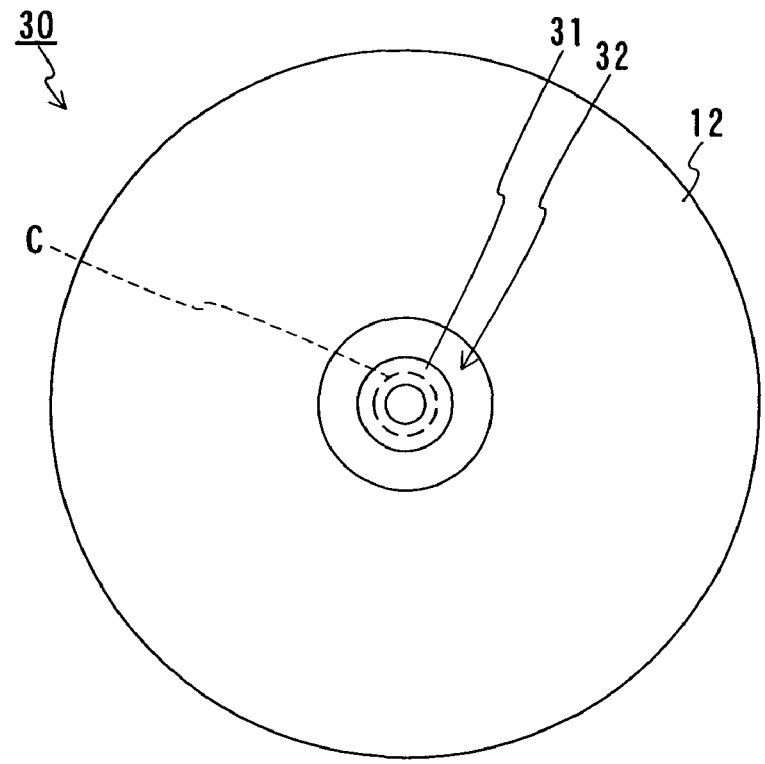
FIGS. 3A and 3B are a plan view and a cross-sectional view showing still another example of an optical disk of the present invention.
Figure 3B:
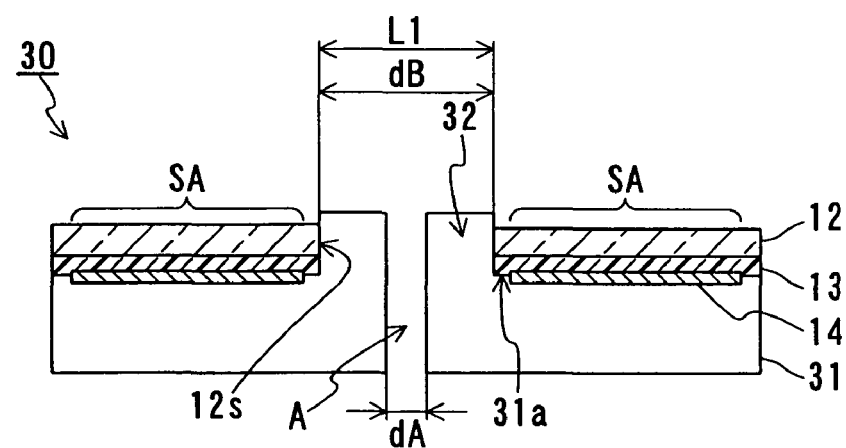
Figure 4A:
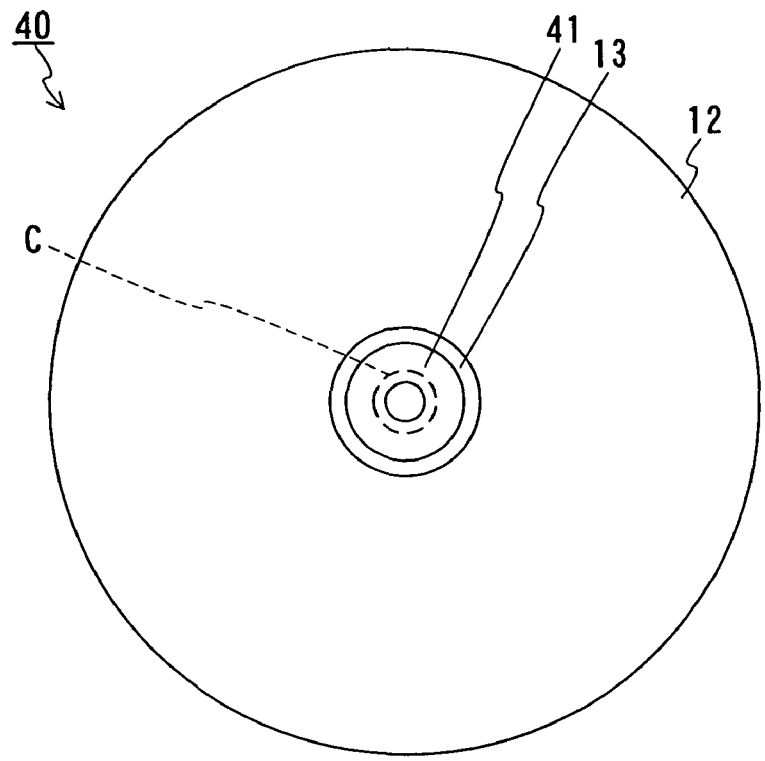
FIGS. 4A and 4B are a plan view and a cross-sectional view showing still another example of an optical disk of the present invention.
Figure 4B:
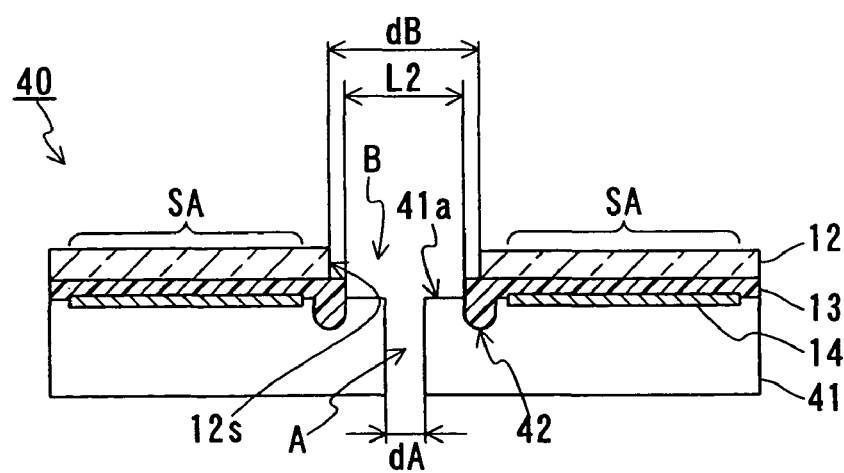
Figure 5A:
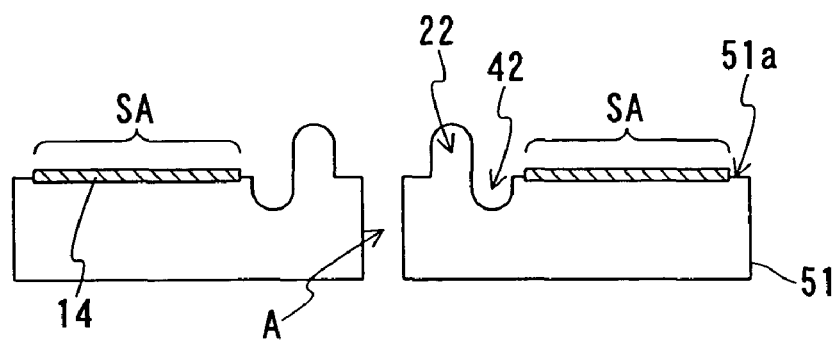
FIG. 5A is a cross-sectional view showing an example of a substrate used in an optical disk of the present invention.
Figure 5B:
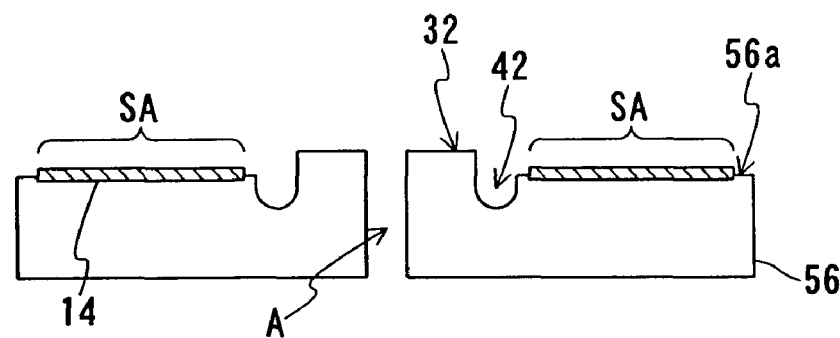
FIG. 5B is a cross-sectional view showing another example of a substrate used in an optical disk of the present invention.

FIGS. 2A and 2B respectively show a plan view and a cross-sectional view of an optical disk 20 in the case where a first substrate 21 has a convex portion in a circular shape. FIGS. 3A and 3B respectively show a plan view and a cross-sectional view of an optical disk 30 in the case where a first substrate 31 has a convex portion in another shape. FIGS. 4A and 4B respectively show a plan view and a cross-sectional view of an optical disk 40 in the case where a first substrate 41 has a concave portion in a circular shape. FIG. 5A is a cross-sectional view of a first substrate 51 in the case where a convex portion and a concave portion in a circular shape are provided, and FIG. 5B is a cross-sectional view of a first substrate 56 in the case where a convex portion and a concave portion in a circular shape are provided. The first substrates 21, 31, 41, 51, and 56 are similar to the first substrate 11 in the portions other than the convex and concave portions. More specifically, principal planes 21*a*, 31*a*, 41*a*, 51*a*, and 56*a* correspond to the principal plane 11*a*. Furthermore, the optical disks 20, 30, and 40 are similar to the optical disk 10 except for the first substrates 21, 31, and 41. Therefore, the repeated description thereof will be omitted here.

As shown in FIGS. 2A and 2B, the first substrate 21 of the optical disk 20 has a convex portion 22 formed in a circular shape so as to surround the central hole A and having an outer diameter L1 equal to a diameter dB of the central hole B, on the principal plane 21*a* with a signal area SA formed thereon. Because of the convex portion 22, an optical disk can be produced easily as described in the following embodiments. Furthermore, it is preferable that the height of the convex portion 22 (i.e., height from the principal plane 21*a*) is 0.05 mm to 0.5 mm. Furthermore, the height of the convex portion 22 preferably is larger than the sum of thickness of the second substrate 12 and the radiation curable resin 13 (this also applies to the convex portion described below). Because of this, when the optical disk 20 is held/stored by being stacked on another optical disk, the reproduction surface does not come into contact with another optical disk, whereby the reproduction surface will not be damaged. Furthermore, as shown in FIG. 2B, it is preferable that the convex portion 22 is formed so as to come into contact with the inner peripheral edge of the second substrate 12 (the outer diameter L1 of the convex portion 22 is prescribed to be equal to the diameter dB of the central hole B) (this also applies to the following convex portion). Because of this, eccentricity between the first substrate 11 and the second substrate 12 can be suppressed. Furthermore, a center cone table or a motor turn table of a clamp does not come into contact with the second substrate 12 during recording/reproduction; therefore, a decrease in strength caused by prescribing the second substrate 12 to be thinner can be prevented, and an increase in a tilt also can be prevented.

As shown in FIGS. 3A and 3B, the first substrate 31 of the optical disk 30 has a convex portion (step difference) 32 formed in a circular shape so as to surround the central hole A and having the outer diameter L1 equal to the diameter dB of the central hole B, on the principal plane 31*a* with a signal area 31 SA formed thereon. In this case, the convex portion 32 extends up to the inner peripheral edge of the first substrate 31.

As shown in FIGS. 4A and 4B, the first substrate 41 of the optical disk 40 has a concave portion 42 formed in a circular shape so as to surround the central hole A and having the diameter L2 equal to or smaller than the diameter dB of the central hole B, on the principal plane 41*a* with a signal area SA formed thereon. It is preferable that the depth of the concave portion 42 (i.e., depth from the principal plane 41*a*) is in a range of 0.01 mm to 0.2 mm. Because of the concave portion 42, an optical disk can be produced easily as described in the following embodiments.

As shown in FIG. 5A, the first substrate 51 has a convex portion 22 and a concave portion 42 on the principal plane 51*a* with a signal area SA formed thereon. The convex portion 22 is formed in a circular shape so as to surround the central hole A and has an outer diameter equal to or smaller than the diameter of the central hole B. The concave portion 42 is formed in a circular shape so as to surround the convex portion 22. Because of this, the above-mentioned effects of the convex portion and the concave portion are obtained.

As shown in FIG. 5B, the first substrate 56 has a convex portion 32 and a concave portion 42 on the principal plane 56*a* with the signal area SA formed thereon. The convex portion 32 is formed in a circular shape so as to surround the central hole A and has an outer diameter equal to or smaller than that of the central hole B. The concave portion 42 is formed in a circular shape so as to surround the convex portion 32. Because of this, the above-mentioned effects of the convex portion and the concave portion are obtained.

It is appreciated that the above-mentioned optical disks 20, 30, and 40 also have the same effects as those of the optical disk 10.

In Embodiment 1, an optical disk in which a signal recording layer is formed only on a first substrate has been described. However, in the optical disk and the method for producing the same according to the present invention, a signal recording layer may be formed on a second substrate (this also applies to the following embodiments). For example, in the optical disk and the method for producing the same according to the present invention, a semi-transparent signal recording layer also may be formed on the second substrate so that both the first and second substrates have a signal recording layer. Furthermore, a plurality of signal recording layers may be formed on the first substrate (this also applies to the following embodiments). Because of these configurations, an optical disk with a double-layered structure can be obtained. In this case, information recorded on both the signal recording layers can be reproduced with laser light incident through the second substrate.

Embodiment 2

Figure 6A:
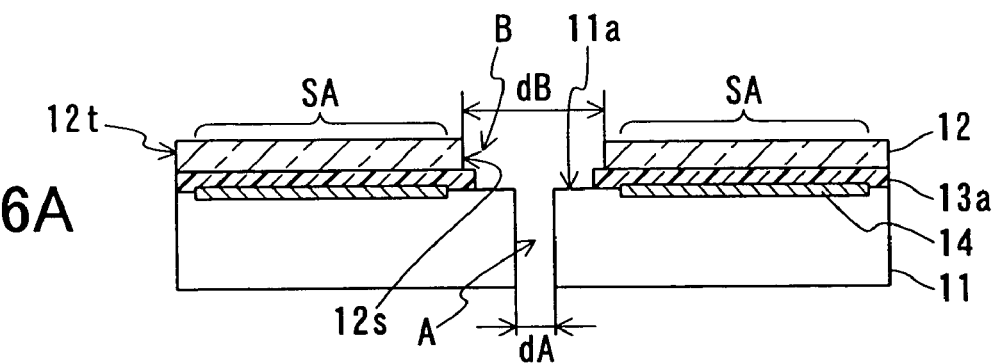
FIGS. 6A and 6B are cross-sectional views showing an example of the processes of a method for producing an optical disk of the present invention.
Figure 6B:
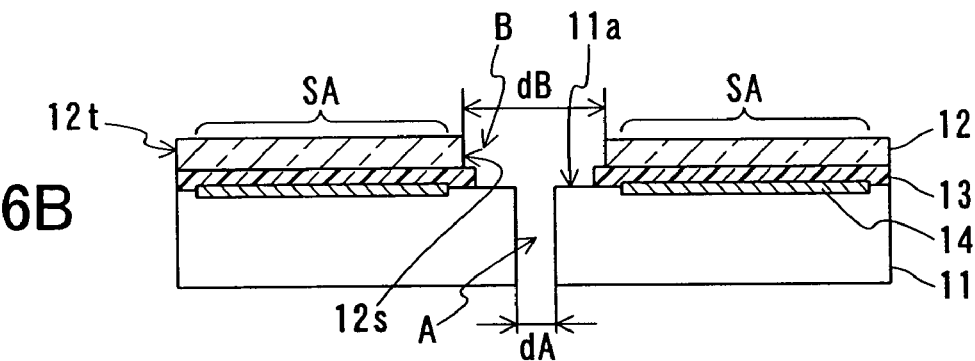

In Embodiment 2, the present invention will be described by way of an example of a method for producing an optical disk. FIGS. 6A and 6B show the processes of producing the optical disk 10 according to the production method of Embodiment 2.

According to the production method of Embodiment 2, as shown in FIG. 6A, the first substrate 11 having the signal area SA on the principal plane 11*a* and the second substrate 12 that is thinner than the first substrate 11 are brought into contact with each other with uncured radiation curable resin 13*a* interposed therebetween so that the principal plane 11*a* faces inside (Process (a)). The first substrate 11 has the central hole A, and the second substrate is transparent and has the central hole B larger in diameter than the central hole A. At this time, the radiation curable resin 13*a* is disposed at least from the inner peripheral edge 12*s* of the second substrate 12 to the outer peripheral edge 12*t* thereof. The radiation curable resin 13*a* may be disposed up to the inner peripheral edge 11*s* of the first substrate 11. However, it is preferable that the radiation curable resin 13*a* is disposed so as not to cover the clamp area C.

The signal area SA of the first substrate 11 can be obtained, for example, by molding resin by injection molding or photopolymerization to form uneven pits, and forming a reactive film (signal recording layer 14) made of Al having a thickness of, for example, 50 nm by sputtering. Furthermore, in the case where the signal area SA is formed of a phase-change film or a colorant film, sputtering or vapor deposition can be utilized. The first substrate 11 is the same as that described in Embodiment 1, which is, for example, a polycarbonate substrate with a thickness of 1.1 mm, a diameter of 120 mm, and a central hole diameter of 15 mm.

The second substrate 12 is the same as that described in Embodiment 1, which is, for example, a polycarbonate or acrylic substrate with a thickness of 90 μm, an outer diameter of 120 mm, and a central hole diameter of 40 mm. The second substrate 12 can be formed by injection molding or casting. The thickness of the second substrate 12 is in a range of 0.03 mm to 0.3 mm.

Thereafter, as shown in FIG. 6B, the radiation curable resin 13a is irradiated with radiation (ultraviolet rays or an electron beam), whereby the radiation curable resin 13a is cured to obtain radiation-cured resin 13, and the first substrate 11 and the second substrate 12 are attached to each other (Process (b)). Radiation may be applied continuously or as a pulse (this also applies to the following embodiments). In this manner, the optical disk 10 can be produced.

Hereinafter, two methods for bringing the first substrate into contact with the second substrate 12 with the radiation curable resin 13a interposed therebetween in the above-mentioned first process will be described.

Figure 7A:
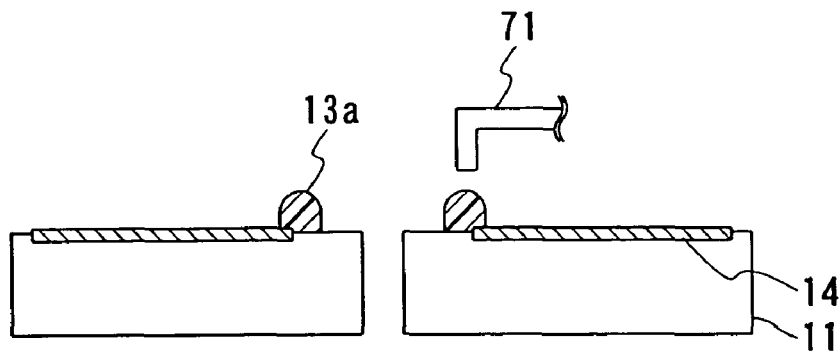
FIGS. 7A to 7D are cross-sectional views showing a part of the processes of a method for producing an optical disk of the present invention.

According to the first method, the first substrate 11 is integrated with the second substrate 12 with the radiation curable resin 13a interposed therebetween, and the first and second substrates 11 and 12 thus integrated are rotated, whereby the radiation curable resin 13a is drawn. FIGS. 7A to 7D show an example of the processes of this method. As shown in FIG. 7A, first, the first substrate 11 is coated with the radiation curable resin 13a in a circular shape with a nozzle 71. At this time, the first substrate 11 or the nozzle 71 is rotated at a low speed (20 rpm to 120 rpm). Furthermore, in order to exactly bring the first substrate 11 into contact with the second substrate 12 up to the inner peripheral edge 12s, the radiation curable resin 13a is coated at a position (for example, a position with a radius of 20 mm to 25 mm) on the first substrate 11 where the inner peripheral edge 12s is disposed.

Figure 7B:
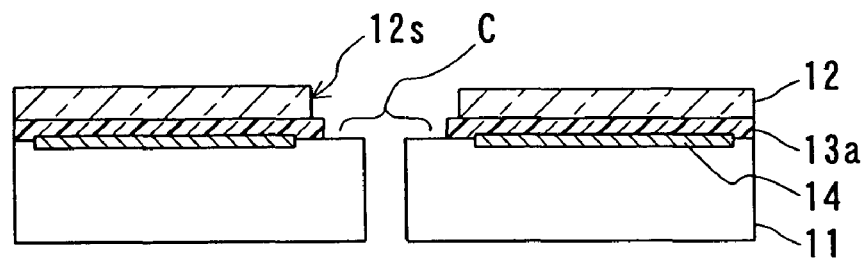
Figure 7C:
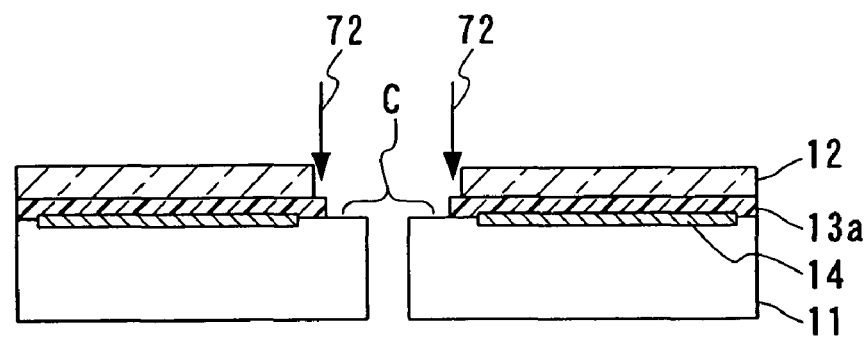

Next, as shown in FIG. 7B, the first substrate 11 and the second substrate 12 are opposed and stacked so that they are positioned concentrically. If the radiation curable resin 13a adheres to the clamp area C, a tilt will be influenced substantially. Therefore, as shown in FIG. 7C, it is preferable to irradiate an outer peripheral side of the clamp area C with radiation 72 such as UV-rays in a circular shape, thereby preventing the radiation curable resin 13a from entering the clamp region C. More specifically, Process (a) may include the process of curing at least a part of the radiation curable resin 13a disposed on an inner side of the signal area SA, before rotating the first substrate 11 (this also applies to the second method). The second substrate 12 may be coated with the radiation curable resin 13a.

Figure 7D:
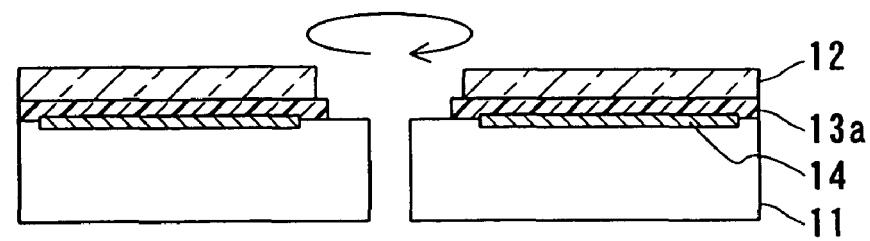

Thereafter, as shown in FIG. 7D, the first substrate 11 and the second substrate 12 are rotated at a high speed (1000 rpm to 10000 rpm) under the condition that they are stacked adjacent each other, whereby the radiation curable resin 13a is dispersed to an outer peripheral portion. Because of this, air bubbles become unlikely to enter the contact portion, and excessive radiation curable resin 13a is shaken off to be discharged from between the first and second substrates 11 and 12. Thus, Process (a) can be conducted.

In the above-mentioned process, in order to render the thickness of the radiation curable resin 13a uniform, it is preferable to select the viscosity of the radiation curable resin 13a in accordance with the rotation number/rotation time of substrates for dispersion of resin, and the thickness of the radiation curable resin 13a. In general, according to the above-mentioned method, the thickness of the radiation curable resin 13a is likely to become thinner on an inner peripheral side and thicker on an outer peripheral side. In order to conduct recording/reproduction under the conditions of a laser with a wavelength of 400 nm and an NA of an objective lens of 0.85 considered for achieving the high density of an optical disk, it is required that the variation in film thickness of the radiation-cured resin 13 is in a range of about ±3 μm with respect to the central value (sum of the thickness of the second substrate 12 and the thickness of the radiation-cured resin 13, e.g., 0.1 mm).

Table 1 shows a relationship between the viscosity of the radiation curable resin 13a and the in-plane variation of the radiation-cured resin 13 in the above-mentioned first method.

TABLE 1

| Viscosity (mPa · s) | 5000 | 3000 | 1500 | 1000 | 600 | 300 | 150 | 50 | 10 | 5 |
|---|---|---|---|---|---|---|---|---|---|---|
| In-plane variation (μm) | 11.1 | 8.1 | 5.5 | 4.7 | 4.3 | 4.1 | 4.1 | 4.3 | 4.7 | 6.1 |

As is apparent from Table 1, by prescribing the viscosity of the radiation curable resin 13a in a range of 10 to 1500 mPa·s, the variation in film thickness of the radiation curable resin 13 can be set at 6 μm or less (i.e., ±3 μm or less).

Furthermore, Table 2 shows a relationship between the viscosity of the radiation curable resin 13a and the cycle time in the above-mentioned first method.

TABLE 2

| Viscosity (mPa · s) | 5000 | 3000 | 1500 | 1000 | 600 | 300 | 150 | 50 | 10 | 5 |
|---|---|---|---|---|---|---|---|---|---|---|
| Cycle time (Sec.) | 90 | 60 | 27 | 18 | 10 | 3.3 | 1.5 | 0.7 | 0.3 | 0.3 |

As is apparent from Table 2, in order to shorten a cycle time, it is preferable to set the viscosity of the radiation curable resin 13a in a range of 10 to 600 mPa·s.

Figure 8A:
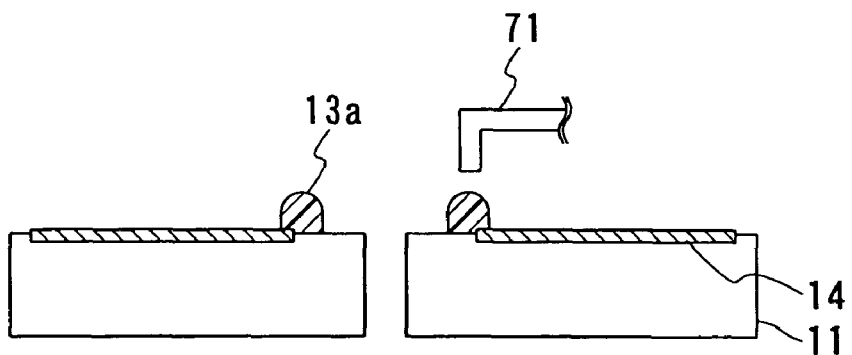
FIGS. 8A to 8C are cross-sectional views showing a part of the processes of a method for producing an optical disk of the present invention.

Next, the second method for conducting the first process will be described. According to the second method, the radiation curable resin 13a is poured onto the first substrate 11, and the first substrate 11 is rotated, whereby the first substrate 11 is coated with the radiation curable resin 13a; then, the first substrate 11 and the second substrate 12 are brought into contact with each other with the radiation curable resin 13a interposed therebetween. FIG. 8 shows an example of the processes of this method. According to the second method, as shown in FIG. 8A, first, the first substrate 11 is coated with the radiation curable resin 13a in a circular shape with a nozzle 71. This process is the same as that described with reference to FIG. 7A.

Figure 8B:
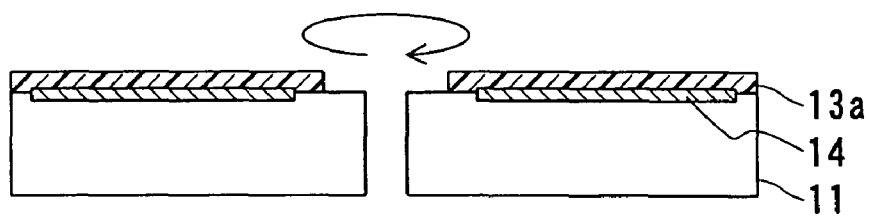

Next, as shown in FIG. 8B, the first substrate 11 is rotated at a high speed (1000 to 10000 rpm), whereby the radiation curable resin 13a is drawn to the outer peripheral portion. At this time, as described in the process shown in FIG. 7C, laser light may be applied to the radiation curable resin 13a on an outer peripheral side of the clamp area C in a circular shape.

Figure 8C:
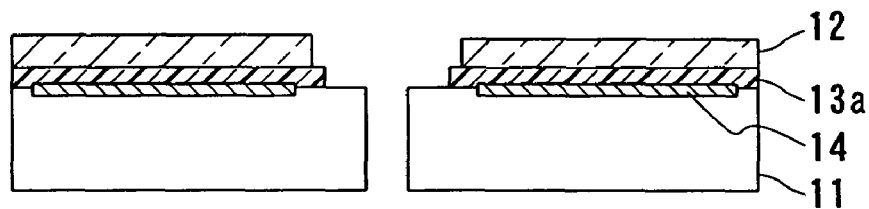
Figure 9:
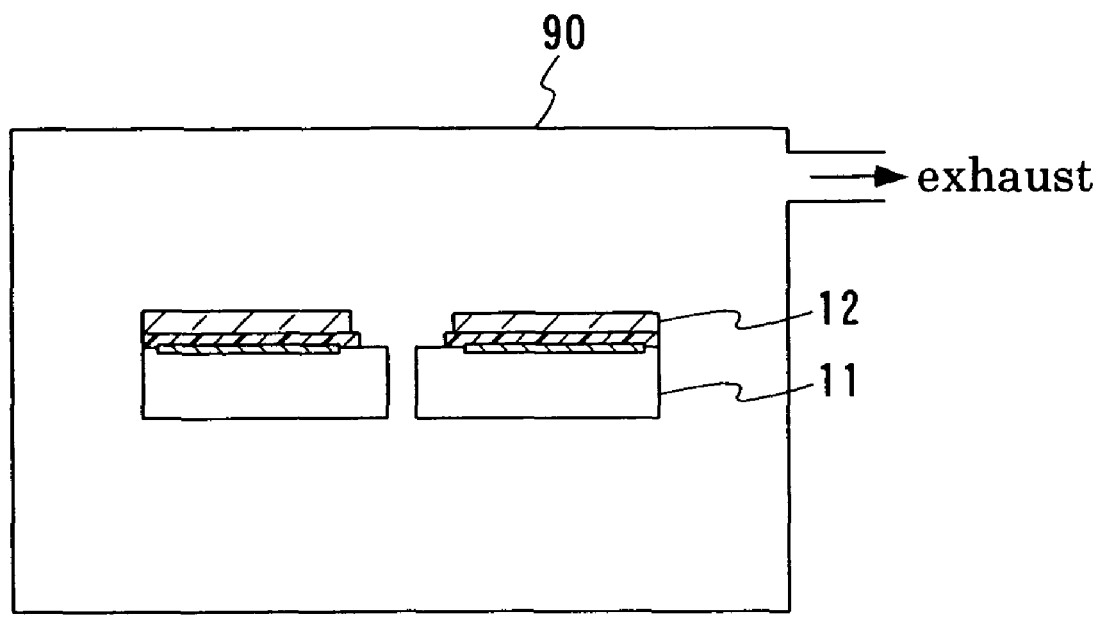
FIG. 9 is a cross-sectional view showing a part of the processes of a method for producing an optical disk of the present invention.

Thereafter, as shown in FIG. 8C, the first substrate 11 and the second substrate 12 are stacked so that they are disposed concentrically and brought into contact with each other. In this manner, the above-mentioned Process (a) can be conducted. An appropriate pressure is applied uniformly during stacking, the distribution of the radiation curable resin 13a can be rendered further uniform. At this time, it is required to take care so that air bubbles do not enter between the first and second substrates 11 and 12. In order to prevent air bubbles from entering therebetween, as shown in FIG. 9, it is preferable to conduct the process of bringing the substrates into contact with each other in a vacuum chamber 90 (i.e., in a vacuum atmosphere).

Table 3 shows a relationship between the viscosity of the radiation curable resin 13a and the in-plane variation of the radiation-cured resin 13 in the above-mentioned second method.

TABLE 3

| Viscosity (mPa · s) | 20000 | 15000 | 5000 | 3000 | 1500 | 1000 | 600 | 300 | 150 | 50 | 10 | 5 |
|---|---|---|---|---|---|---|---|---|---|---|---|---|
| In-plane variation (μm) | 7 | 5.4 | 3.2 | 2.8 | 2.6 | 2.5 | 2.4 | 2.4 | 2.5 | 2.7 | 3.5 | 6.2 |

As is apparent from Table 3, by prescribing the viscosity of the radiation curable resin 13a in a range of 10 to 15000 mPa·s, the variation in film thickness of the radiation-cured resin 13 can be set at 6 μm or less (±3 μm or less).

Furthermore, Table 4 shows a relationship between the viscosity of the radiation curable resin 13a and the cycle time in the above-mentioned first method.

TABLE 4

| Viscosity (mPa · s) | 20000 | 15000 | 5000 | 3000 | 1500 | 1000 | 600 | 300 | 150 | 50 | 10 | 5 |
|---|---|---|---|---|---|---|---|---|---|---|---|---|
| Cycle time (Sec.) | 100 | 80 | 35 | 25 | 15 | 10 | 4 | 1.5 | 0.5 | 0.3 | 0.3 | 0.2 |

As is apparent from Table 4, in order to shorten the cycle time, it is preferable to set the viscosity of the radiation curable resin 13a in a range of 10 to 1000 mPa·s.

As described above, according to the method for producing an optical disk of Embodiment 2, an optical disk described in Embodiment 1 can be produced easily.

According to the production method of Embodiment 2, the first substrates 21, 31, 41, 51, or 56 described in Embodiment 1 may be used in place of the first substrate 11. By using these substrates, an inner peripheral side of a circular convex portion or concave portion can be prevented from being coated with the radiation curable resin 13a. In this case, the process of irradiation in a circular shape is not required, so that production becomes easy. Furthermore, by prescribing the outer diameter L1 of the convex portion to be equal to the diameter dB of the second substrate 12, eccentricity can be prevented from occurring in the course of attachment of the first substrate to the second substrate.

Embodiment 3

In Embodiment 3, the present invention will be described by way of another example of a method for producing an optical disk. Regarding the components described in the above-mentioned embodiments, the repeated description may be omitted here.

Figure 10A:
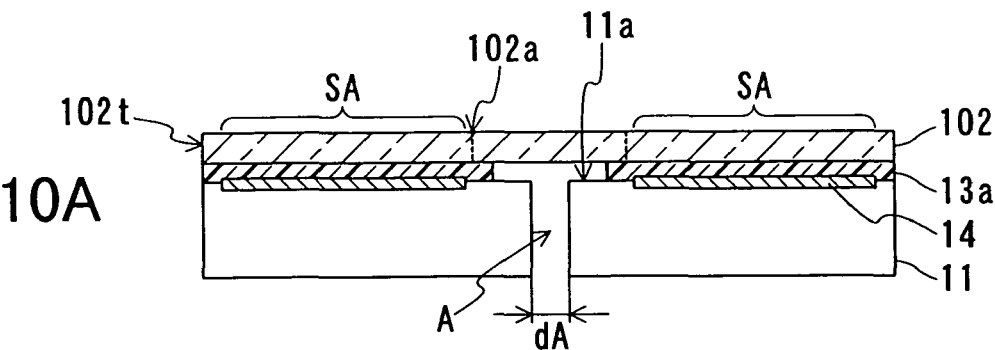
FIGS. 10A to 10C are cross-sectional views showing another example of the processes of a method for producing an optical disk of the present invention.
Figure 10B:
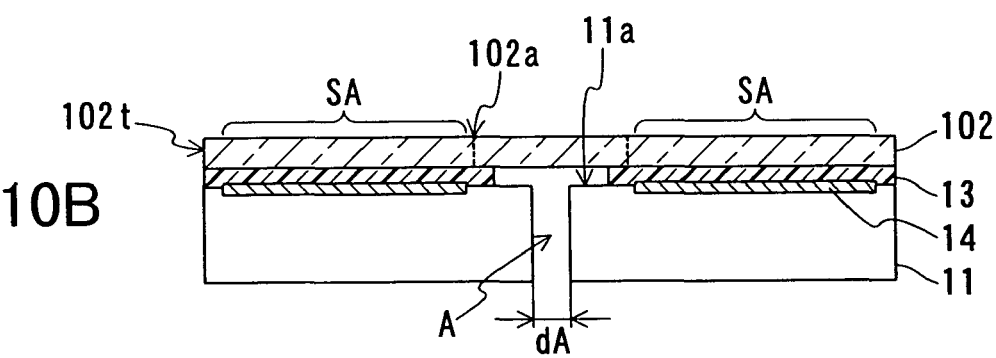
Figure 10C:
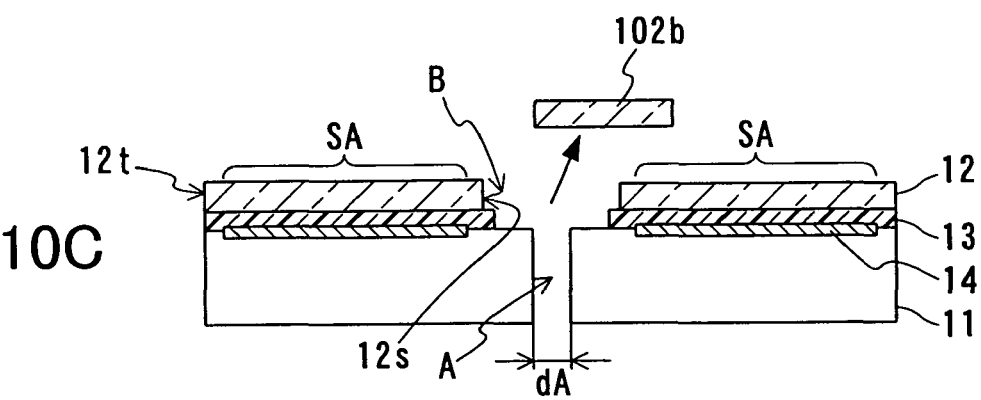

FIGS. 10A to 10C show the processes of a production method of Embodiment 3. According to the production method of Embodiment 3, as shown in FIG. 10A, first, the first substrate 11 having the signal area SA on the principal plane 11a and the central hole A and a second substrate 102 that is transparent and thinner than the first substrate 11 are brought into contact with each other with the radiation curable resin 13a interposed therebetween so that the principal plane 11a faces inside (Process (A)). The first substrate 11 is the same as that described in Embodiment 1. The second substrate 102 is different from the second substrate 12 described in Embodiment 1, only in that the second substrate 102 does not have a central hole, and an incision 102a in a dotted line shape is formed at a portion where the central hole B will be formed in the following process. The second substrate 102 may have both an incision and a central hole. In this case, it is preferable that the second substrate 102 has a central hole with the same size as that of the central hole A. When the second substrate 102 has a central hole with the same size as that of the central hole A of the first substrate 11, eccentricity in the course of attachment of the substrates can be prevented easily.

Figure 11:
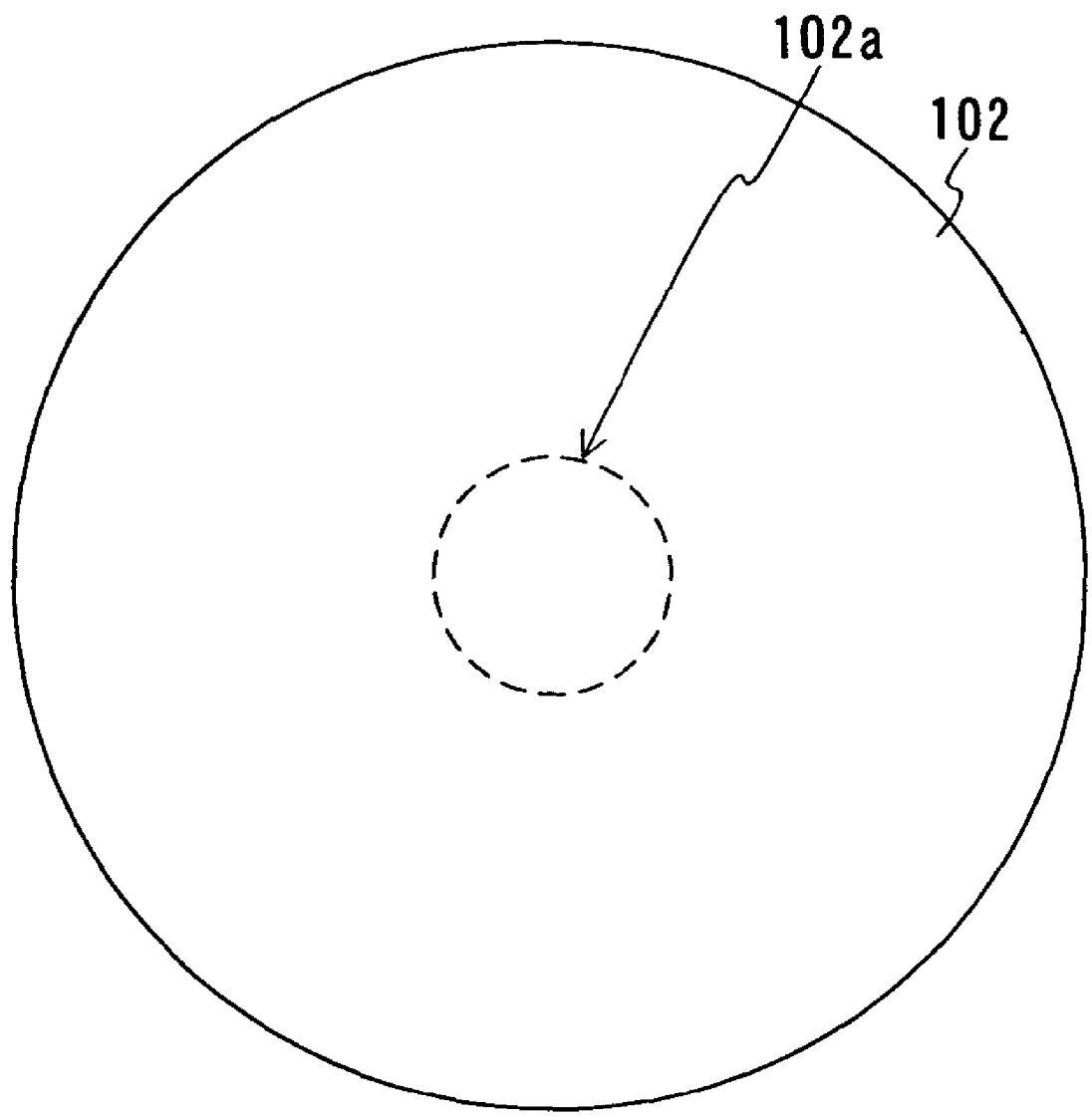
FIG. 11 is a plan view showing an example of a substrate used in a method for producing an optical disk of the present invention.

FIG. 11 is a plan view of the second substrate 102. The second substrate 102 includes the incision 102a at an outer peripheral portion (that corresponds to the inner peripheral edge 12s of the second substrate 12) of a position where the central hole B will be formed in the following process.

In Process (A), the radiation curable resin 13a is disposed at least from the portion of the incision 102a (outer peripheral portion of a position where the central hole B will be formed) to the outer peripheral edge 102t of the second substrate 102.

Thereafter, as shown in FIG. 10B, the radiation curable resin 13a is irradiated with radiation for curing to obtain radiation-cured resin 13, whereby the first substrate 11 is attached to the second substrate 120 (Process (B)). This process is the same as that in FIG. 6B described in Embodiment 2, and two methods (see FIGS. 7A–7D and 8A–8C) described in Embodiment 2 can be used.

Then, as shown in FIG. 10C, a part 102b of the second substrate 102 is removed to form the second substrate 102 having the central hole B with a diameter larger than that of the central hole A. At this time, because of the incision 102a, the central hole B can be formed easily. The second substrate 12 is the same as that described in Embodiment 1.

Thus, the optical disk described in Embodiment 1 can be produced easily. According to the production method of Embodiment 3, an easy-to-handle optical disk that is recordable at high density can be produced easily.

It is appreciated that the first substrate 41 described in Embodiment 1 may be used in place of the first substrate 11.

Embodiment4

In Embodiment 4, the present invention will be described by way of still another example of a method for producing an optical disk. FIG. 12 shows a cross-sectional view showing the processes of a production method of Embodiment 4.

Figure 12A:
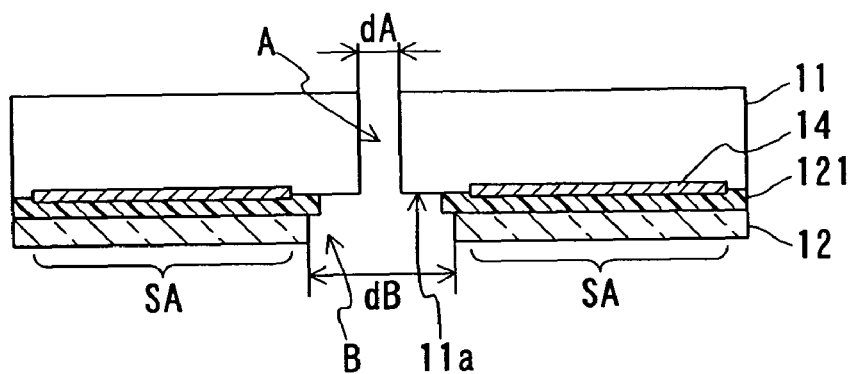
FIGS. 12A and 12B are cross-sectional views showing another example of the processes of a method for producing an optical disk of the present invention.

As shown in FIG. 12A, first, the first substrate 11 and the second substrate 12 are opposed to each other with uncured radiation curable resin 121 interposed therebetween so that the center of the first substrate 11 is aligned with that of the second substrate 12 (Process (i)). At this time, the first substrate 11 and the second substrate 12 are opposed to each other so that the principal plane 11a on which the signal area SA is formed faces inside. Process (i) will be described later in more detail. As the radiation curable resin 121, the resin similar to the radiation curable resin 13a can be used. As described in Embodiment 1, the first substrate 11 and the second substrate 12 have the central hole A with the diameter dA and the central hole B with the diameter dB, where dA<dB. The thickness of the second substrate 12 is in a range of 0.03 mm to 0.3 mm.

Figure 12B:
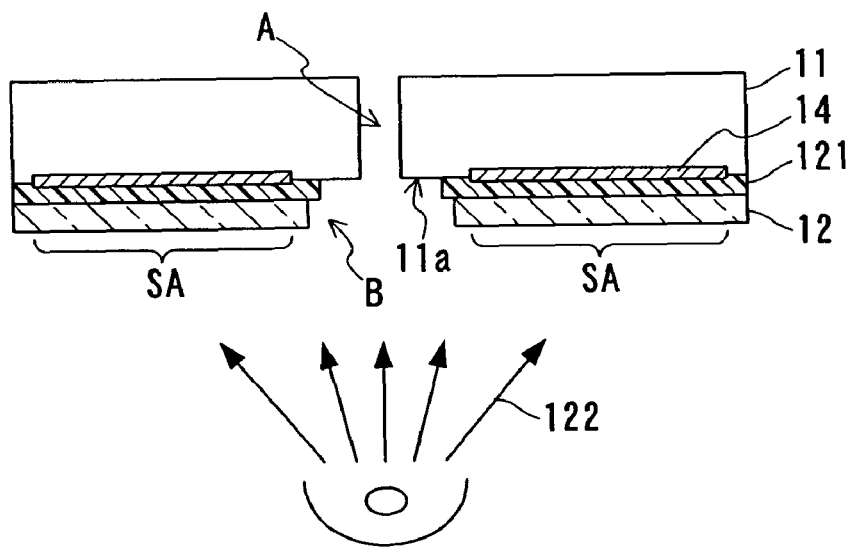

Next, as shown in FIG. 12B, the radiation curable resin 121 is irradiated with radiation 122 such as an electron beam and UV-rays, whereby the radiation curable resin 121 is cured (Process (ii)). Thus, an optical disk can be produced.

FIG. 12B shows the case where the radiation 122 is applied through the second substrate 12. However, an irradiation direction of the radiation 122 is selected depending upon the structure of an optical disk. More specifically, the irradiation direction of the radiation 122 is selected so that the radiation 122 easily reaches the radiation curable resin 121. For example, in the case where the signal recording layer 14 is formed only on the second substrate 12 side, the radiation 122 is applied through the first substrate 11. Furthermore, in the case of an optical disk with a double-layered structure in which the signal recording layer 14 is formed on both the first substrate 11 and the second substrate 12, the radiation 122 is applied through the second substrate 12.

Next, a method for conducting Process (i) by using a pin that fits in the central hole A and the central hole B will be described with reference to FIGS. 13A to 13E. According to this method, a pin 131 with a first pin 131a that fits in the central hole A and a second pin 131b that fits in the central hole B is used. The second pin 131b has a cylindrical shape. The outer diameter of the first pin 131a substantially is equal to the inner diameter of the second pin 131b. The first pin 131a is inserted into the second pin 131b so that they are disposed concentrically. The outer diameter of the first pin 131a substantially is equal to dA, and the outer diameter of the second pin 131b substantially is equal to dB.

Figure 13A:
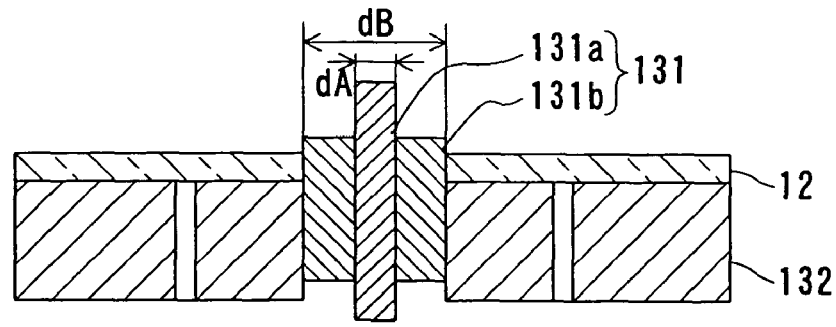
FIGS. 13A to 13E are cross-sectional views showing a part of the processes of a method for producing an optical disk of the present invention.

First, as shown in FIG. 13A, the second substrate 12 is fixed on a table 132 in which the pin 131 is disposed in such a manner that the second pin 131b is inserted into the central hole B (Process (i-1)). The pin 131 is disposed at the center of the table 132. It is preferable that the second pin 131b is disposed so that its upper surface is positioned higher than a principal plane 12a of the second substrate 12. Because of this, the second substrate 12 can be fixed securely. The table 132 is rotatable. Furthermore, the table 132 is provided with an exhaust port 132a for fixing the second substrate 12. Due to the exhaust through the exhaust port 132a, the second substrate 12 is fixed on the table 132. The second substrate 12 may be fixed by using static electricity or adhesive material in place of the exhaust port 132a.

Figure 13B:
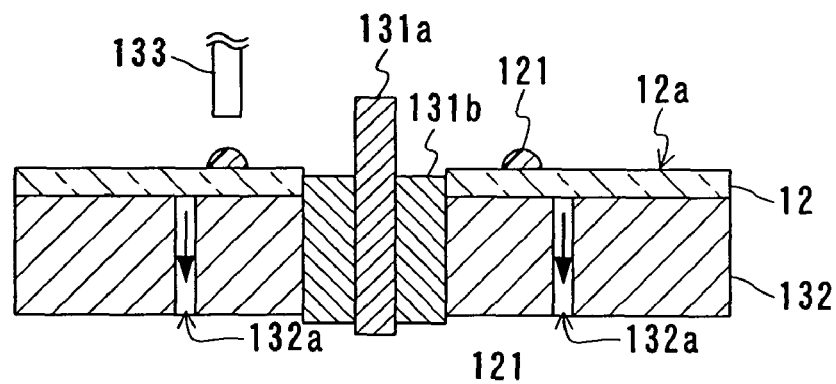

Next, as shown in FIG. 13B, the radiation curable resin 121 is poured onto the second substrate 12 (Process (i-2)). By rotating the table 132 while pouring resin through a dispenser 133, the radiation curable resin 121 can be disposed in a circular shape. Furthermore, by moving the dispenser 133 simultaneously with the rotation of the table 132, the radiation curable resin 121 can be disposed in a spiral shape.

Figure 13C:
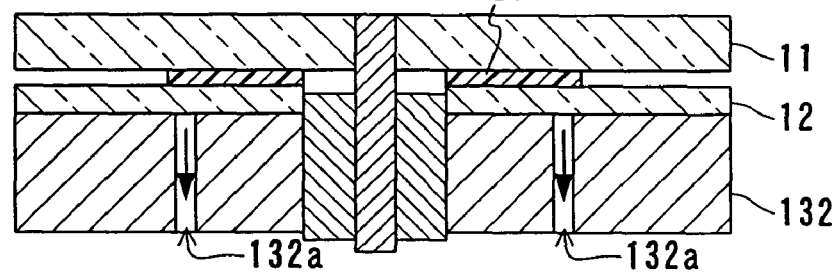

Next, as shown in FIG. 13C, the first substrate 11 is moved so that the first pin 131a is inserted into the central hole A, and the first substrate 11 and the second substrate 12 are opposed to each other with the radiation curable resin 121 interposed therebetween (Process (i-3)). In FIGS. 13A to 13E, although the signal recording layer 14 is not shown (this also applies to the following drawings), the first substrate 11 is disposed so that the signal recording layer 14 faces inside. It is preferable that Process (i-3) is conducted after the second pin 131b is moved so that the upper surface of the second pin 131b is positioned below the upper surface of the second substrate 12. The second pin 131b can be moved at any time after Process (i-1) and before Process (i-3). Even when the movement of the second pin 131b causes the radiation curable resin 121 to penetrate the inside of the central hole B of the second substrate 12, the resin can be prevented from adhering to the second pin 131b. As a result, an optical disk can be produced with good productivity.

In Process (i-3), the first pin 131a is aligned with the second pin 131b. Therefore, the first substrate 11 is disposed so that the center of the first substrate 11 is aligned with the center of the second substrate 12. Furthermore, since the second substrate 12 is fixed on the flat table 132, the surface of the second substrate 12 is kept flat. As a result, the radiation curable resin 121 comes into contact with the first substrate 11 uniformly, and air bubbles can be prevented from being mixed with the resin. Furthermore, the thickness of the radiation curable resin 121 can be rendered uniform. By rendering the thickness of the radiation curable resin 121 uniform, an optical disk can be produced, in which focus servo control and tracking servo control are conducted easily (i.e., in which recording/reproduction can be conducted stably).

Figure 13D:
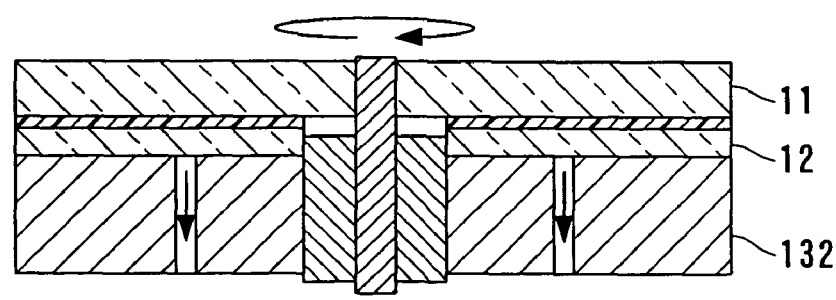

Next, as shown in FIG. 13D, by rotating the first substrate 11 and the second substrate 12, the radiation curable resin 121 is drawn (Process (i-4)). Thus, Process (i) can be conducted.

Figure 13E:
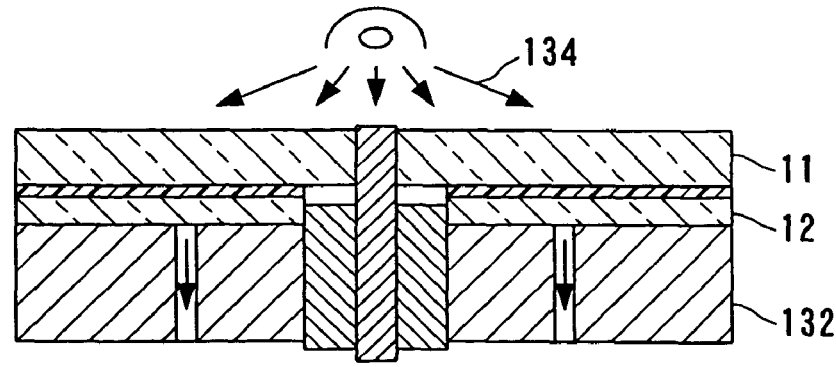

Finally, as shown in FIG. 13E, the radiation curable resin 121 is cured with radiation 134. In this manner, an optical disk can be produced. In the case where radiation is applied through the second substrate 12, radiation should be applied through the table 132 that transmits radiation. Furthermore, light may be applied through the second substrate 12 by inverting the first substrate 11 and the second substrate 12 while they are opposed to each other.

Figure 14A:
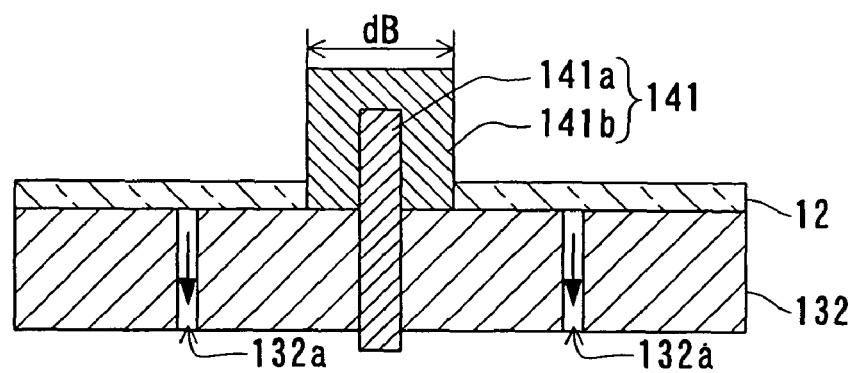
FIGS. 14A and 14B are cross-sectional views showing a part of the processes of a method for producing an optical disk of the present invention.
Figure 14B:
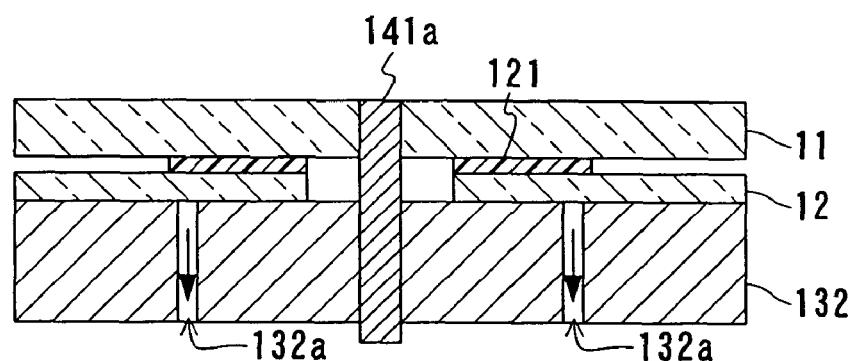

A pin in another shape may be used in place of the pin 131. FIGS. 14A–14B, 15A–15B, and 16A–16B illustrate the case where various pins are used. A pin 141 shown in FIG. 14A has a first pin 141a and a second pin 141b. The second pin 141b is provided with a concave portion in which the first pin 141a fits. In the case of using the pin 141, as shown in FIG. 14A, the second substrate 12 is fixed under the condition that the first pin 141a is covered with the second pin 141b. Furthermore, the first substrate 11 is fixed under the condition that the second pin 141b is removed, as shown in FIG. 14B.

Figure 15A:
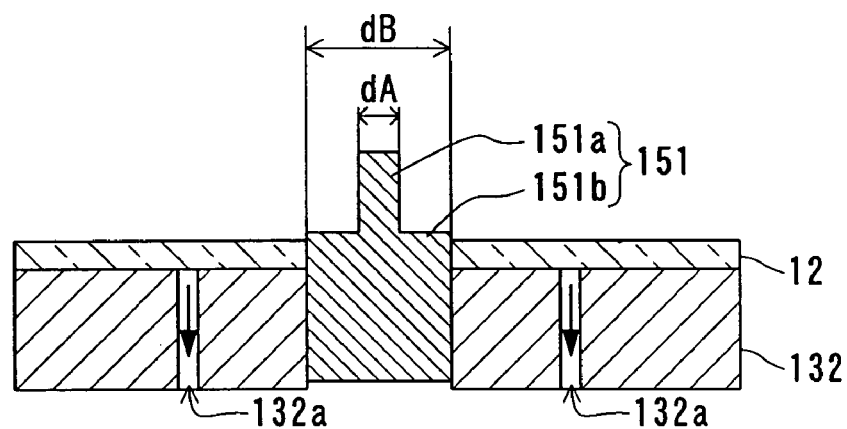
FIGS. 15A and 15B are cross-sectional views showing a part of the processes of a method for producing an optical disk of the present invention.
Figure 15B:
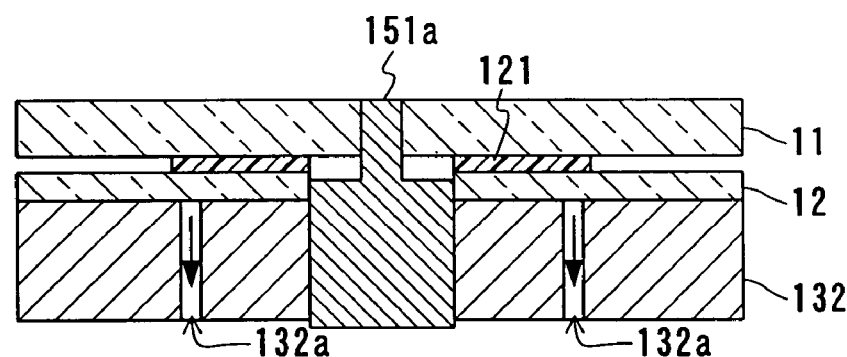

A pin 151 shown in FIG. 15A includes a first pin 151a and a second pin 151b integrated with each other. In the case of using the pin 151, as shown in FIG. 15A, the second substrate 12 is fixed with the second pin 151b. Furthermore, the first substrate 11 is fixed under the condition that the second pin 151b is lowered, as shown in FIG. 15B.

Figure 16A:
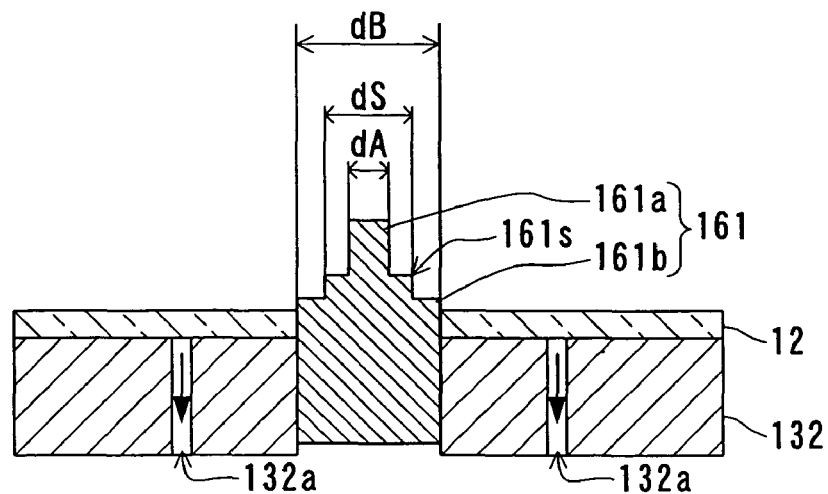
FIGS. 16A and 16B are cross-sectional views showing a part of the processes of a method for producing an optical disk of the present invention.
Figure 16B:
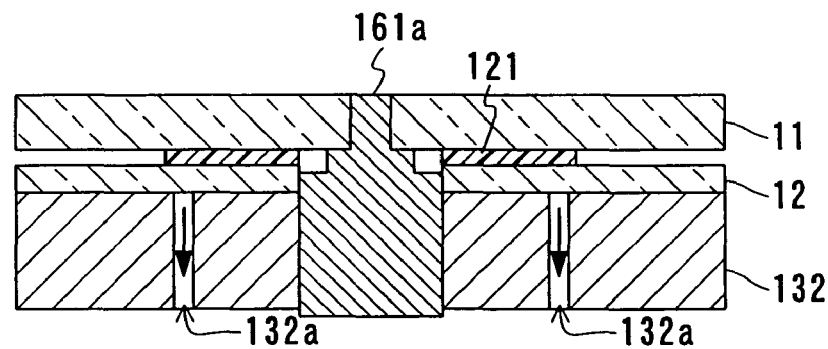

A pin 161 shown in FIG. 16A includes a first pin 161a and a second pin 161b integrated with each other. Furthermore, a step difference 161s is formed between the first pin 161a and the second pint 161b. The outer diameter dS of the step difference 161s is larger than dA and smaller than dB. In the case of using the pin 161, as shown in FIG. 16A, the second substrate 12 is fixed with the second pin 161b. Furthermore, the first substrate 11 is fixed under the condition that the second pin 161b is lowered, as shown in FIG. 16B. At this time, the interval between the first substrate 11 and the second substrate 12 can be controlled by the step difference 161s. In the pins 151 and 161 in which the first pin and the second pin are integrated with each other, the first pin can be rendered concentric with the second pin with good precision.

FIGS. 14A–14B to 16A–16B show the case where the outer diameters of the first pin and the second pin are constant. However, these outer diameters may not be constant. For example, a pin that is widened toward the table 132 so as to fit in the central holes A and B may be used. Furthermore, in the pin 141, the outer diameter of the first pin 141a and the concave portion of the second pin 141b may be tapered.

Embodiment 5

In Embodiment 5, the present invention will be described by way of still another example of a method for producing an optical disk. FIG. 17 is a cross-sectional view showing the processes of a production method of Embodiment 5.

Embodiment 5 is directed to a method for producing an optical disk having the first substrate 11 in which the central hole A with a diameter dA is formed and the second substrate 12 in which the central hole B with a diameter dB is formed. The first substrate 11 and the second substrate 12 are the same as those described in Embodiment 1.

Figure 17A:
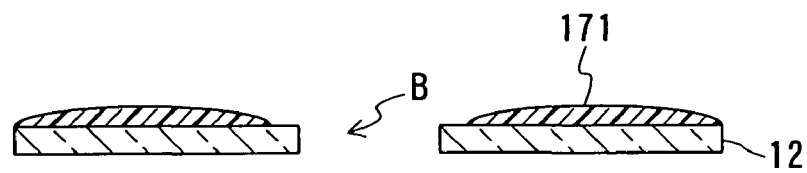
FIGS. 17A to 17C are cross-sectional views showing a part of the processes of a method for producing an optical disk of the present invention.
Figure 18:
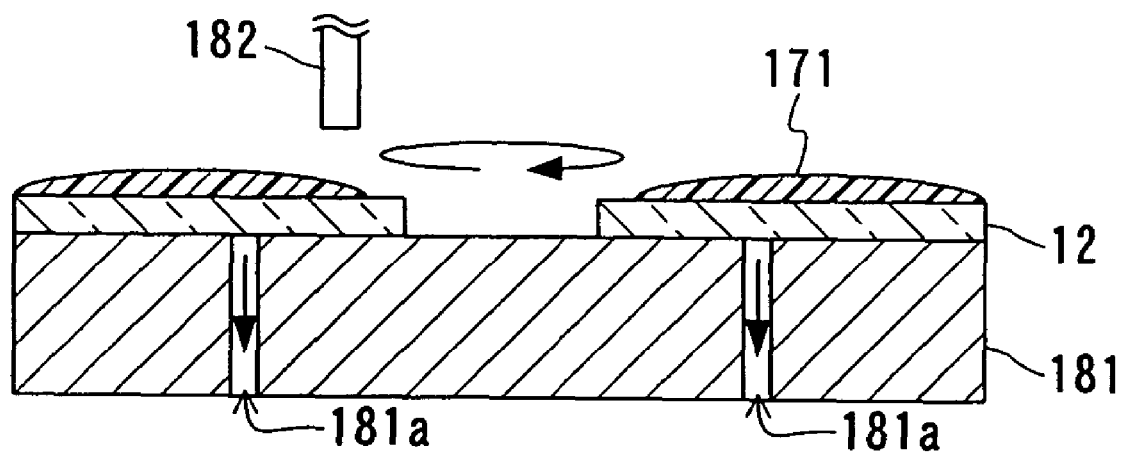
FIG. 18 is a cross-sectional view showing a part of the processes of a method for producing an optical disk of the present invention.

First, at least one substrate selected from the first substrate 11 and the second substrate 12 is coated with radiation curable resin (Process (I)). For example, as shown in FIG. 17A, the second substrate 12 is coated with radiation curable resin 171. In the following description, the case where the second substrate 12 is coated with the radiation curable resin 171 will be described. The radiation curable resin 171 can be coated as shown in FIG. 18. More specifically, first, the second substrate 12 is fixed on a table 181 in which an exhaust port 181a is formed. Thereafter, the radiation curable resin 171 is poured from a dispenser 182 while the table 181 is rotated, whereby the radiation curable resin 171 is disposed in a circular or spiral shape. Thereafter, by rotating the table 181 at a high speed, the second substrate 12 can be coated with the radiation curable resin 171. Furthermore, the second substrate 12 may be coated with the radiation curable resin 171 by screen printing, using the apparatus shown in FIG. 23.

Figure 17B:
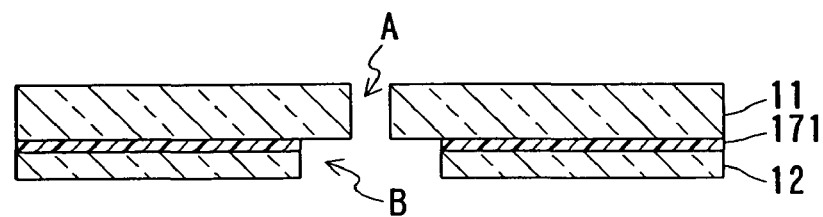

Next, as shown in FIG. 17B, the first substrate 11 and the second substrate 12 are opposed to each other with the radiation curable resin 171 interposed therebetween in a vacuum atmosphere, so that the center of the first substrate 11 is aligned with the center of the second substrate 12 (Process (II)). Process (II) will be described later in more detail.

Figure 17C:
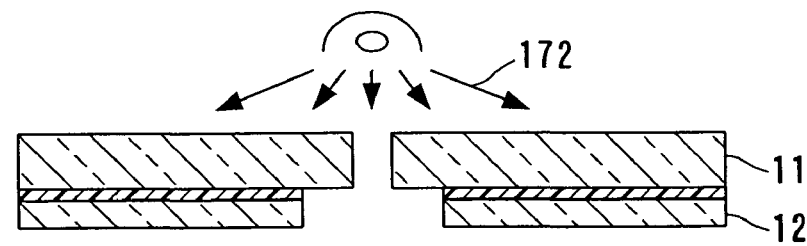

Next, as shown in FIG. 17C, the radiation curable resin 171 is irradiated with radiation 172 such as an electron beam and UV-rays to be cured (Process (III)). Thus, an optical disk can be produced.

Figure 19A:
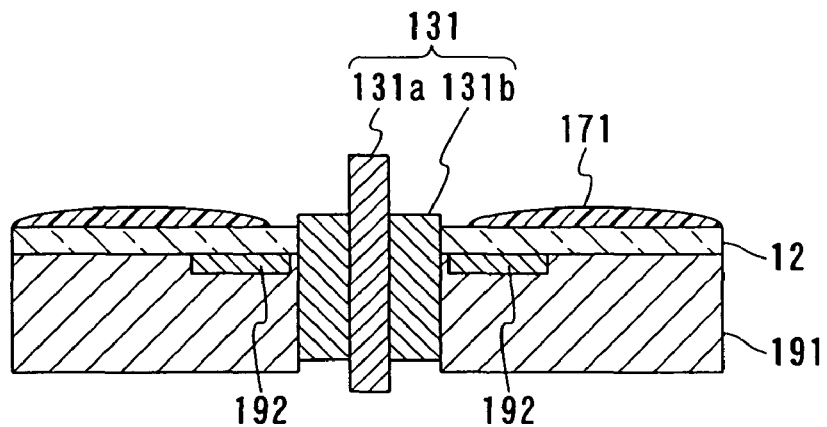
FIGS. 19A to 19C are cross-sectional views showing a part of the processes of a method for producing an optical disk of the present invention.

Hereinafter, the case where Process (II) is conducted using the pin similar to that in Embodiment 4 will be described. First, as shown in FIG. 19A, the second substrate 12 is fixed on a table 191 in which the pin 131 is disposed so that the second pin 131b is inserted into the central hole B (Process (II-1)). The pin 131 is the same as that described in Embodiment 4.

The table 191 includes a fixing member 192 for fixing the substrate. As the fixing member 192, for example, an apparatus for fixing a substrate with static electricity or an adhesive sheet can be used. The pin 131 is disposed at the center of the table 132. It is preferable that the second pin 131b is disposed so that its upper surface is positioned higher than the upper surface of the second substrate 12. Because of this, the second substrate 12 can be fixed securely.

Figure 19B:
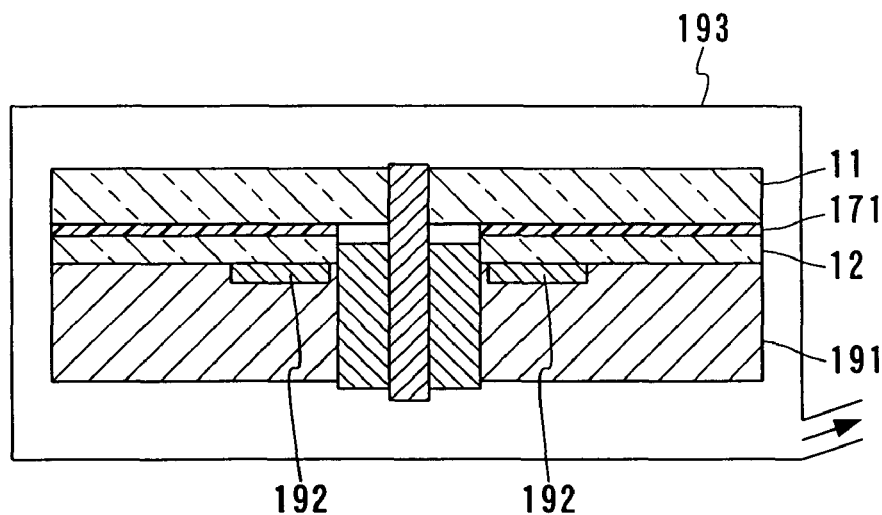

Next, as shown in FIG. 19B, the first substrate 11 is moved so that the first pin 131a is inserted into the first central hole A in a vacuum atmosphere, and the first substrate 11 and the second substrate 12 are opposed to each other with the radiation curable resin 171 interposed therebetween (Process (II-2)). More specifically, after the first substrate 11 and the second substrate 12 are disposed in a container 193, and the container 193 is exhausted through a vacuum pump, the first substrate 11 and the second substrate 12 should be stacked adjacent each other. By fixing the second substrate 12, the second substrate 12 can be prevented from moving during the exhaust step. Furthermore, when the first substrate 11 and the second substrate 12 are stacked adjacent each other, it is preferable that the second pin 131b is moved so that the upper surface thereof is lowered below that of the second substrate 12. The second pin 131b may be moved at any time after Process (II-1) and before Process (II-2). By moving the second pin 131b, even when the radiation curable resin 171 penetrates the inside of the central hole B of the second substrate 12, the resin can be prevented from adhering to the second pin 131b. As a result, an optical disk can be produced with good productivity.

Figure 19C:
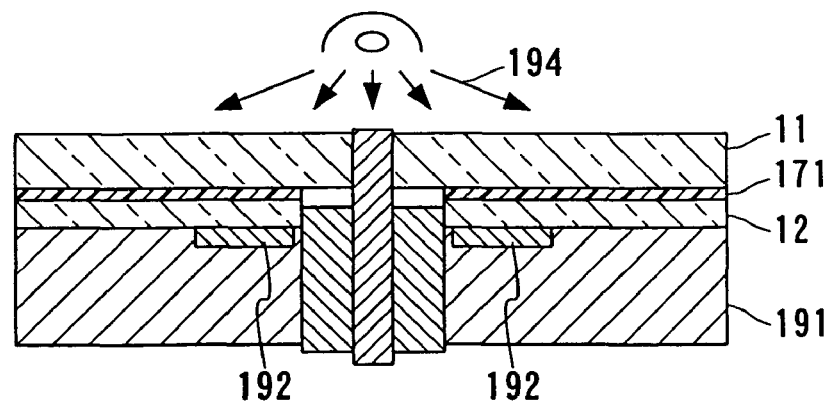

Next, as shown in FIG. 19C, the radiation curable resin 171 is irradiated with radiation 194 such as an electron beam and UV-rays to be cured. Thus, an optical disk can be produced. According to the method shown in FIGS. 19A to 19C, two substrates are attached to each other in a vacuum atmosphere, so that air bubbles can be prevented from entering therebetween. Pin 141, 151, or 161 may be used in place of the pin 131.

Figure 20:
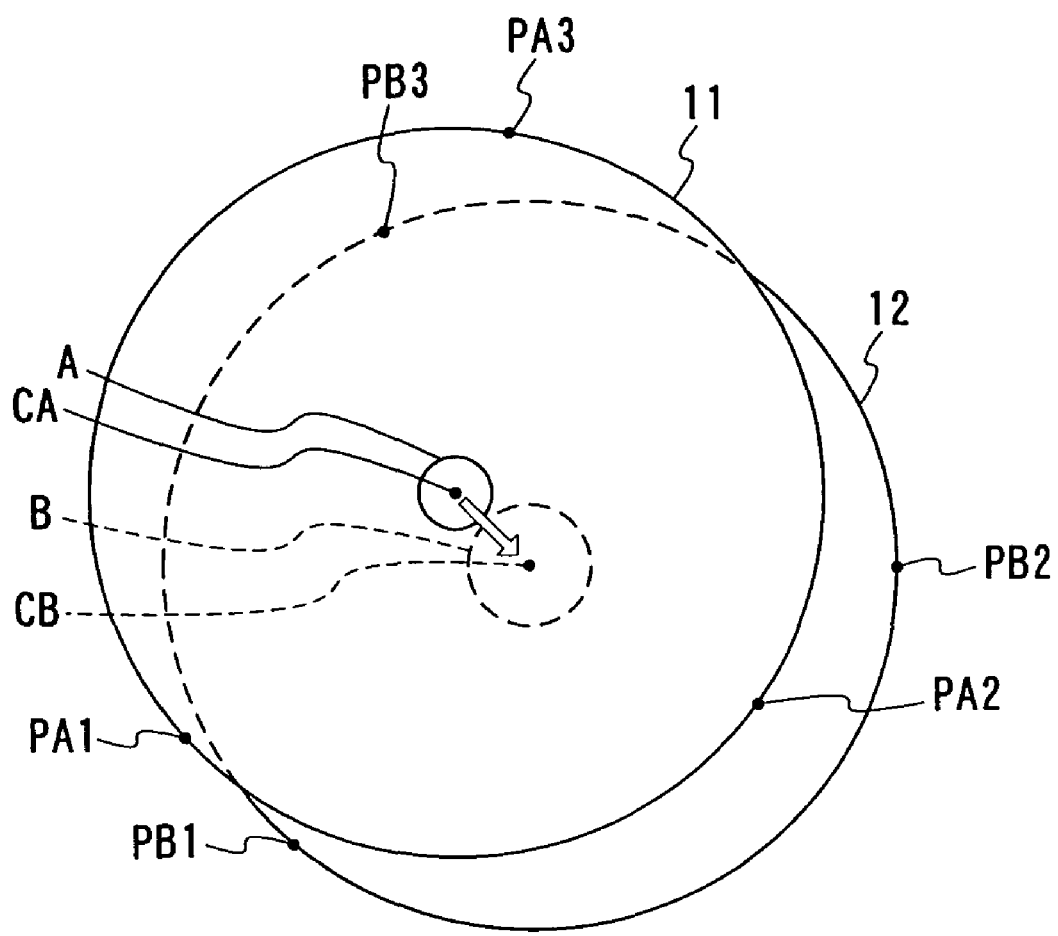
FIG. 20 is a cross-sectional view showing a part of the processes of a method for producing an optical disk of the present invention.

Next, an example of a method for conducting Process (II) without using a pin will be described. According to this method, the centers of the first and second substrates 11 and 12 are calculated based on the respective outer peripheries, and they are aligned with each other. For example, as shown in FIG. 20, a center CA of the first substrate 11 is obtained from at least three coordinates (PA1, PA2, PA3) on an outer periphery of the first substrate 11. Similarly, a center CB of the second substrate 12 is obtained from at least three coordinates (PB1, PB2, PB3) on an outer periphery of the second substrate 12. Then, the first substrate 11 or the second substrate 12 is moved so that the center CA is aligned with the center CB, whereby the first and second substrates 11 and 12 are attached to each other. The centers CA and CB may be obtained from three coordinates on an inner periphery of the central holes A and B.

Figure 21A:
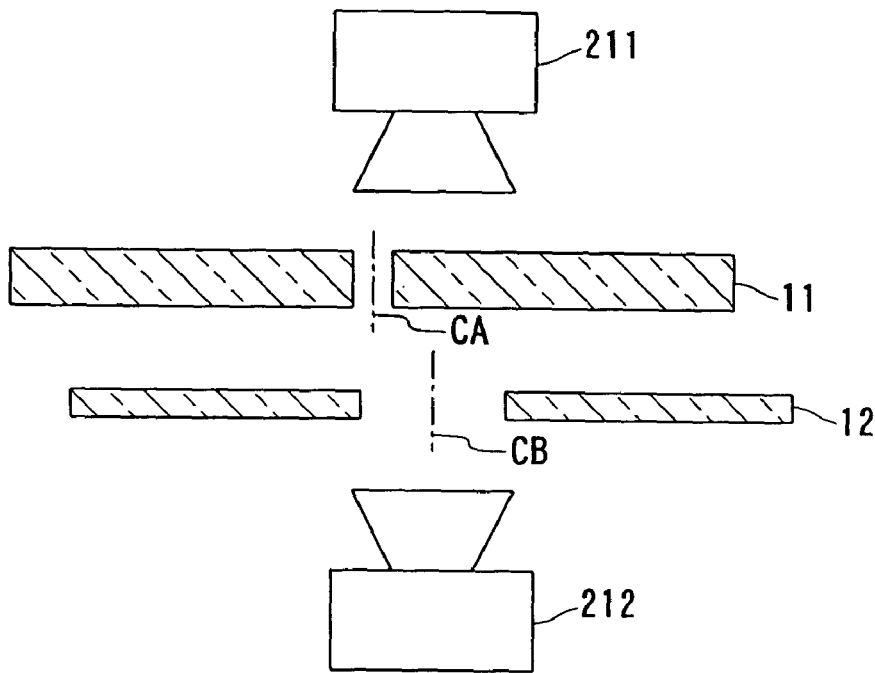
FIGS. 21A and 21B are cross-sectional views showing a part of the processes of a method for producing an optical disk of the present invention.
Figure 21B:
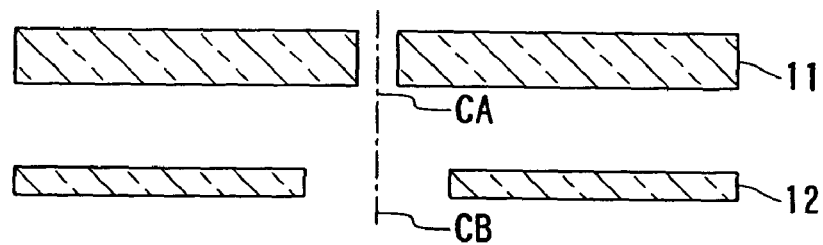

According to the method in FIG. 20, more specifically, as shown in FIG. 21A, image processing of the first substrate 11 and the second substrate 12 is conducted by using two cameras 211 and 212, and the centers CA and CB are obtained. Then, as shown in FIG. 21B, the center CA is aligned with the center CB. Thus, Process (II) can be conducted.

Embodiment 6

Figure 22:
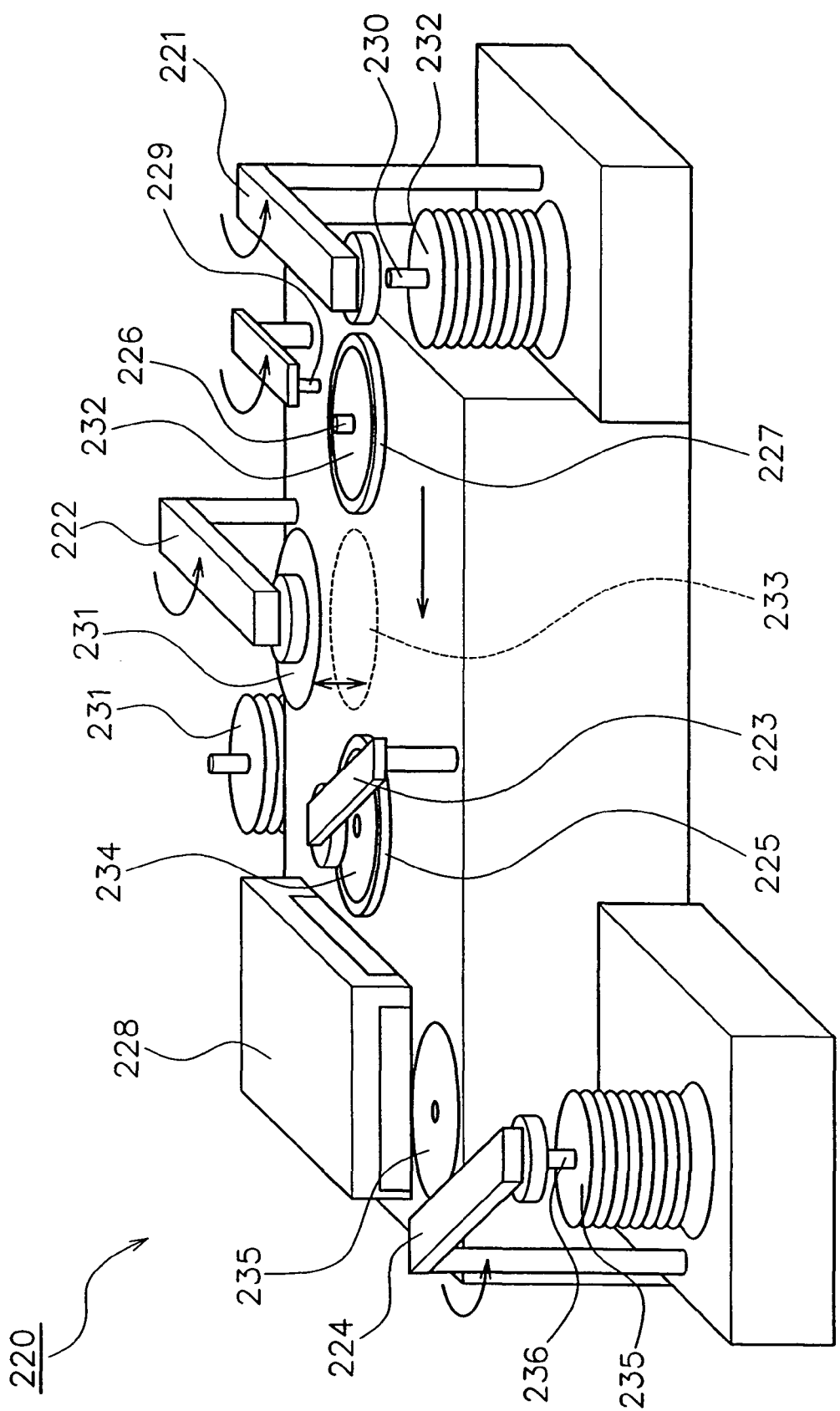
FIG. 22 is a perspective view schematically showing an example of an apparatus for producing an optical disk of the present invention.

In Embodiment 6, the present invention will be described by way of an example of an apparatus for producing an optical disk. FIG. 22 is a schematic perspective view of a production apparatus 220 of Embodiment 6. In FIG. 22, driving members are not shown.

Referring to FIG. 22, the production apparatus 220 includes transport arms 221 to 224, a table 225, a table 227 at the center of which a pin 226 is disposed, a resin curing portion 228, and a nozzle 229. The transport arms 221 to 224 and the nozzle 229 respectively are rotated and raised by driving members. Furthermore, the tables 225 and 227 are rotated and moved by driving members. The pin 226 can be moved upwards/downwards by driving members. The driving member can be formed by combining at least one selected from a motor, an air cylinder, and a hydraulic cylinder.

In the production apparatus 220, the second substrate 232 is transported from a substrate holder 230 to the table 227 by the transport arm 221. At this time, the second substrate 232 is disposed so that the pin 226 is inserted into the central hole B. The table 227 fixes the second substrate 232 by vacuum, static electricity, or an adhesive member.

Figure 23:
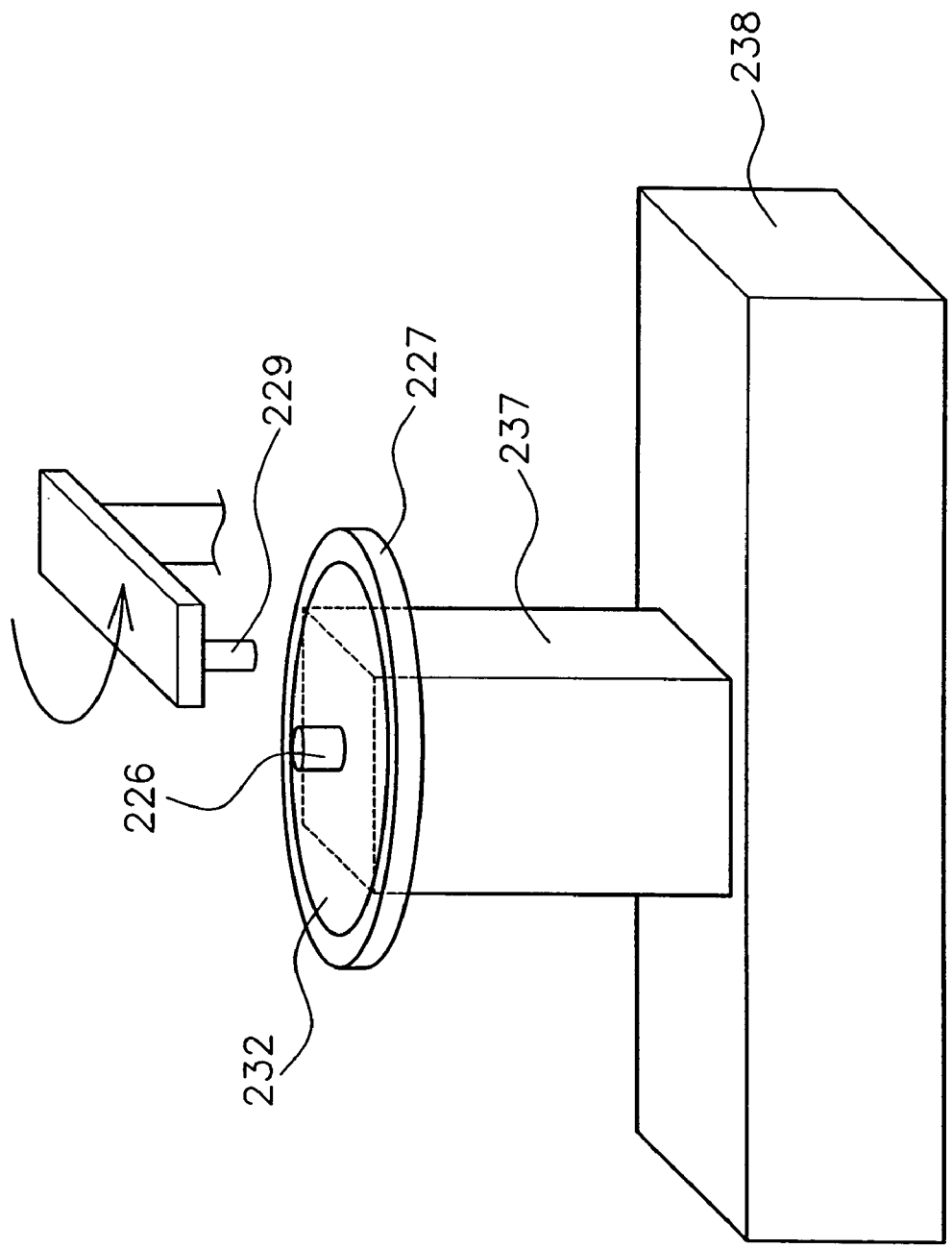
FIG. 23 is a perspective view schematically showing a part of an exemplary apparatus for producing an optical disk of the present invention.

Radiation curable resin is poured from the nozzle 229 to the second substrate 232 disposed on the table 227. The nozzle 229 functions to coat the second substrate 232 with the radiation curable resin. By rotating the table 227 while the resin is poured, the radiation curable resin can be disposed in a circular or spiral shape on the second substrate 232. FIG. 23 is an enlarged view of the table 227. The table 227 is rotated by a driving member 237. The driving member 237 is moved by a driving member 238.

After the resin is poured, the table 227 on which the second substrate 232 is disposed is moved to a stacking portion 233 together with the pin 226 by a driving member. In the stacking member 233, the first substrate 231 is transported onto the second substrate 232 by the transport arm 222. The first substrate 231 is disposed so that the pin 226 is inserted into the central hole A. Thus, the pin 226 functions to dispose the first substrate 231 and the second substrate 232 so that the center of the first substrate 231 is aligned with that of the second substrate 232. As the pin 226, the pins 131, 141, 151, and 161 described in Embodiment 4 can be used.

Thereafter, by rotating the table 227, the first substrate 231 and the second substrate 232 are rotated, whereby the radiation curable resin is drawn. In this manner, the first substrate 231 and the second substrate 232 are stacked with the resin interposed therebetween. The transport arm 223 moves a stacked substrate 234 to the table 225. The substrate 234 disposed on the table 225 is moved to the resin curing portion 228. The resin curing portion 228 is used for curing the radiation curable resin. The resin curing portion 228 includes an irradiation member for applying radiation such as an electron beam and UV-rays. More specifically, the resin curing portion 228 includes an electron beam source, a metal halide lamp, a mercury lamp, or a rare gas lamp such as a xenon lamp. By irradiating the radiation curable resin with an electron beam or UV-rays in the resin curing part 228, the radiation curable resin is cured, and the first substrate 231 and the second substrate 232 are attached to each other. Thus, an optical disk 235 is formed. The optical disk 235 thus formed can be transported to a substrate holder 236 by the transport arm 224.

In the production apparatus 220, the first substrate 231 may be exchanged with the second substrate 232. In the production apparatus 220, the case has been described in which a coating member for coating at least one substrate selected from the first substrate 231 and the second substrate 232 with radiation curable resin includes the nozzle 229. However, the coating member may be an apparatus as shown in FIG. 24.

Figure 24:
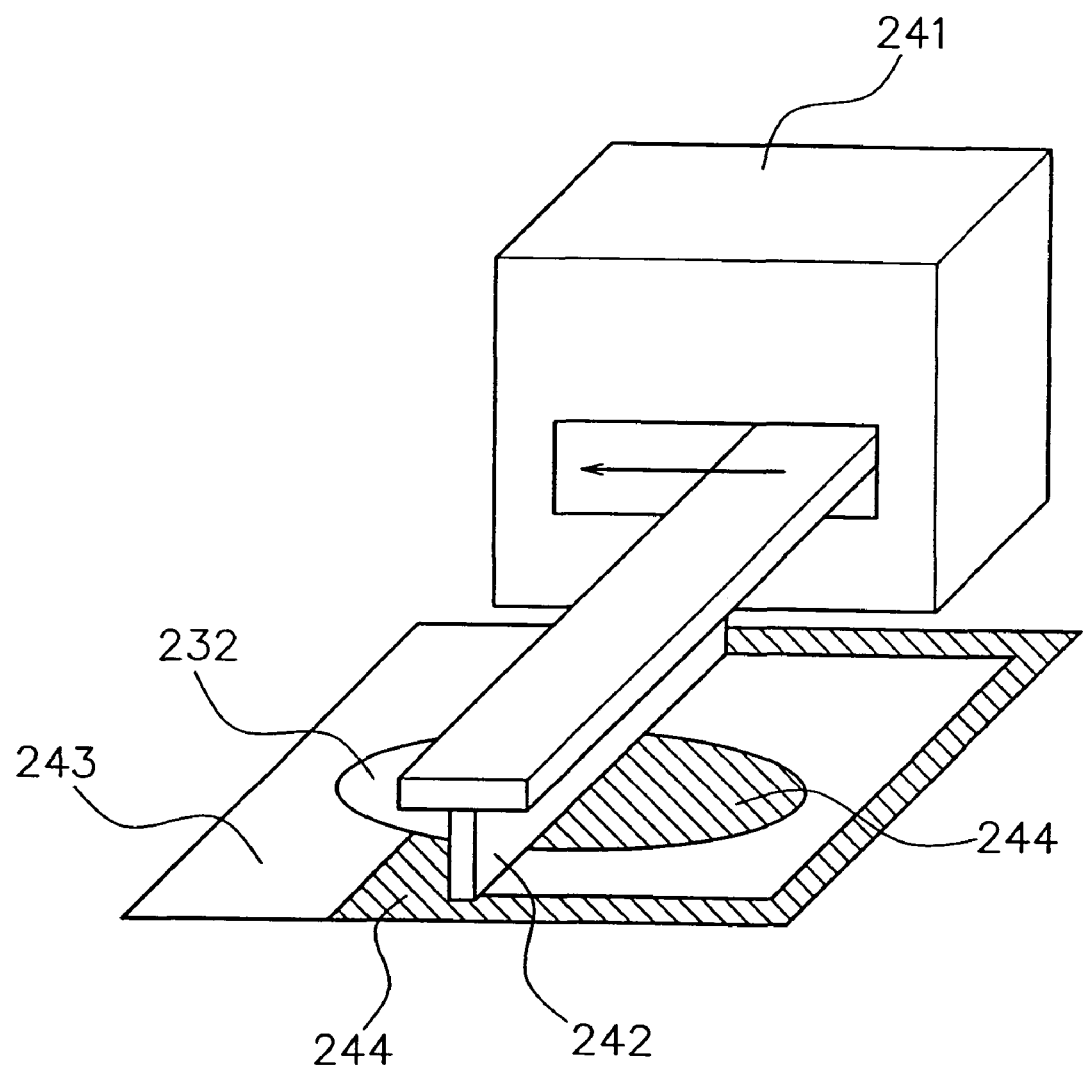
FIG. 24 is a perspective view schematically showing a part of another exemplary apparatus for producing an optical disk of the present invention.

The apparatus shown in FIG. 24 includes a driving member 241, a spatula 242, and a screen 243. The screen 243 is provided with a pattern for coating of resin. On the screen 243, radiation curable resin 244 (hatched portion) is disposed. In this apparatus, the screen 243 is disposed on the second substrate 232, and thereafter, the spatula 242 is moved by the driving member 241, whereby the second substrate 232 is coated with resin. In the case where the second substrate 232 disposed on the table 227 is coated with resin, the second substrate 232 is fixed before being coated with the resin, and the pin 226 is moved from a coating surface. In the case of using the coating apparatus shown in FIG. 24, it is preferable that the resin curing portion 228 includes a pressure-reducible container, and the first substrate 231 and the second substrate 232 are stacked in the container. The pressure-reducible container may be disposed before the resin curing portion 228 on production lines.

Furthermore, FIG. 22 shows the apparatus in which the disposing member for disposing the first substrate 231 and the second substrate 232 in a concentric manner includes the pin 226. However, in the production apparatus of the present invention, two substrates may be disposed by image processing, as described with reference to FIGS. 21A and 21B. In this case, the production apparatus includes a camera, a processing apparatus for calculation processing of an image captured by the camera, and a movement apparatus for moving a substrate.

By using the production apparatus of Embodiment 6, the production method described in Embodiments 4 and 5 can be conducted easily.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disk comprising a first substrate having a signal area on a principal plane and a central hole A and a second substrate that is transparent and attached to the first substrate,
wherein the second substrate is thinner than the first substrate and has a central hole B whose diameter is larger than that of the central hole A, and
the first substrate and the second substrate are attached to each other with an adhesive member disposed therebetween so as to extend at least from an inner peripheral edge of the second substrate to an outer peripheral edge thereof.

2. An optical disk according to claim 1, wherein the adhesive member is radiation curable resin.

3. An optical disk according to claim 1, wherein a thickness of the second substrate is in a range of 0.03 mm to 0.3 mm.

4. An optical disk according to claim 1, wherein the central hole B is larger than a clamp area of the optical disk.

5. An optical disk according to claim 1, wherein the adhesive member is disposed on an outer peripheral side of a clamp area or disposed so as to cover the entire clamp area.

6. An optical disk according to claim 1, wherein a thickness of a clamp area of the first substrate is in a range of 1.1 mm to 1.3 mm.

7. An optical disk according to claim 1, wherein the first substrate includes, on the principal plane, at least one selected from the group consisting of a convex portion formed in a circular shape so as to surround the central hole A and having an outer diameter equal to or smaller than a diameter of the central hole B, and a concave portion formed in a circular shape so as to surround the central hole A and having a diameter equal to or smaller than the diameter of the central hole B.

8. An optical disk according to claim 7, wherein a height of the convex portion is larger than a sum of a thickness of the second substrate and a thickness of the adhesive member.

9. An optical disk according to claim 1, wherein an average thickness of the adhesive member is in a range of 0.5 μm to 30 μm.

10. An optical disk according to claim 1, wherein the optical disk is adapted for reproduction of information by application of a laser having a wavelength of 450 nm or less.

11. A method for producing an optical disk including a first substrate having a central hole A and a second substrate that is transparent and has a central hole B whose diameter is larger than that of the central hole A, comprising the processes of:
(a) bringing the first substrate having a signal area on a principal plane and the second substrate that is thinner than the first substrate into contact with each other with radiation curable resin interposed therebetween so that the principal plane faces inside; and
(b) irradiating the radiation curable resin with radiation to cure the radiation curable resin, thereby attaching the first substrate to the second substrate,
wherein, in the process (a), the radiation curable resin is disposed so as to extend at least from an inner peripheral edge of the second substrate to an outer peripheral edge thereof.

12. A method for producing an optical disk according to claim 11, wherein a thickness of the second substrate is in a range of 0.03 mm to 0.3 mm.

13. A method for producing an optical disk according to claim 11, wherein the process (a) includes interposing the radiation curable resin between the first and second substrates, and rotating the first and second substrates to draw the radiation curable resin.

14. A method for producing an optical disk according to claim 11, wherein the process (a) includes pouring the radiation curable resin onto the first substrate, rotating the first substrate to coat the first substrate with the radiation curable resin, and bringing the first substrate and the second substrate into contact with each other with the radiation curable resin interposed therebetween.

15. A method for producing an optical disk according to claim 14, wherein, in the process (a), the first substrate and the second substrate are brought into contact with each other in a vacuum atmosphere.

16. A method for producing an optical disk according to claim 11, wherein the first substrate includes, on the principal plane, at least one selected from the group consisting of a convex portion formed in a circular shape so as to surround the central hole A and having an outer diameter equal to or smaller than a diameter of the central hole B, and a concave portion formed in a circular shape so as to surround the central hole A and having a diameter equal to or smaller than that of the central hole B.

17. A method for producing an optical disk according to claim 16, wherein a height of the convex portion is larger than a sum of a thickness of the second substrate and a thickness of the radiation curable resin.

18. A method for producing an optical disk, comprising the processes of:
(A) bringing a first substrate having a signal area on a principal plane and a central hole A and a second substrate that is transparent and thinner than the first substrate into contact with each other with radiation curable resin interposed therebetween so that the principal plane faces inside;
(B) irradiating the radiation curable resin with radiation to cure the radiation curable resin, thereby attaching the first substrate to the second substrate; and
(C) removing a part of the second substrate to form a central hole B whose diameter is larger than that of the central hole A in the second substrate,
wherein, in the process (A), the radiation curable resin is disposed so as to extend at least from an outer periphery of a position where the central hole B is formed to an outer peripheral edge of the second substrate.

19. A method for producing an optical disk according to claim 18, wherein a thickness of the second substrate is in a range of 0.03 mm to 0.3 mm.

20. A method for producing an optical disk according to claim 18, wherein the process (A) includes interposing the radiation curable resin between the first and second substrates, and rotating the first and second substrates to draw the radiation curable resin.

21. A method for producing an optical disk according to claim 18, wherein the process (A) includes pouring the radiation curable resin onto the first substrate, rotating the first substrate to coat the first substrate with the radiation curable resin, and bringing the first substrate and the second substrate into contact with each other with the radiation curable resin interposed therebetween.

22. A method for producing an optical disk according to claim 21, wherein, in the process (A), the first substrate and the second substrate are brought into contact with each other in a vacuum atmosphere.

23. A method for producing an optical disk, comprising the processes of:

(i) opposing a first substrate in which a central hole A with a diameter dA is formed to a second substrate in which a central hole B with a diameter dB is formed with radiation curable resin interposed therebetween so that a center of the first substrate is aligned with a center of the second substrate; and (ii) irradiating the radiation curable resin with radiation to cure the radiation curable resin, wherein dA<dB, and a thickness of the second substrate is in a range of 0.03 mm to 0.3 mm.

24. A method for producing an optical disk according to claim 23, wherein, in the process (i), the center of the first substrate is aligned with the center of the second substrate by using a pin that fits in the first and second central holes A and B.

25. A method for producing an optical disk according to claim 24, wherein the process (i) comprises the processes of:
(i-1) fixing the second substrate on a table in which the pin is disposed so that the pin is inserted into the central hole B;
(i-2) pouring the radiation curable resin onto the second substrate;
(i-3) moving the first substrate so that the pin is inserted into the central hole A, thereby opposing the first substrate to the second substrate with the radiation curable resin interposed therebetween; and
(i-4) rotating the first and second substrates to draw the radiation curable resin.

26. A method for producing an optical disk according to claim 25, wherein the pin includes a first pin that fits in the central hole A and a second pin that fits in the central hole B,
in the process (i-1), the second substrate is fixed with the second pin, and
in the process (i-3), the first substrate is fixed with the first pin.

27. A method for producing an optical disk according to claim 26, comprising, after the process (i-1) and before the process (i-2), lowering an upper surface of the second pin below an upper surface of the second substrate.

28. A method for producing an optical disk according to claim 26, wherein the second pin has a cylindrical shape, and the first pin is inserted into the second pin.

29. A method for producing an optical disk including a first substrate in which a central hole A with a diameter dA is formed and a second substrate in which a central hole B with a diameter dB is formed, comprising the processes of:
(I) coating at least one substrate selected from the group consisting of the first substrate and the second substrate with radiation curable resin;
(II) opposing the first substrate to the second substrate with the radiation curable resin interposed therebetween in a vacuum atmosphere so that a center of the first substrate is aligned with a center of the second substrate; and
(III) irradiating the radiation curable resin with radiation to cure the radiation curable resin,
wherein dA<dB, and a thickness of the second substrate is in a range of 0.03 mm to 0.3 mm.

30. A method for producing an optical disk according to claim 29, wherein, in the process (II), the center of the first substrate is aligned with the center of the second substrate by using a pin that fits in the first and second central holes A and B.

31. A method for producing an optical disk according to claim 30, wherein the process (II) includes the processes of:
(II-1) fixing the second substrate on a table in which the pin is disposed so that the pin is inserted into the central hole B; and
(II-2) in a vacuum atmosphere, moving the first substrate so that the pin is inserted into the central hole A, thereby opposing the first substrate to the second substrate with the radiation curable resin interposed therebetween.

32. A method for producing an optical disk according to claim 31, wherein the pin includes a first pin that fits in the central hole A and a second pin that fits in the central hole B,
in the process (II-1), the second substrate is fixed with the second pin, and
in the process (II-2), the first substrate is fixed with the first pin.

33. A method for producing an optical disk according to claim 32, further comprising, after the process (II-1) and before the process (II-2), lowering an upper surface of the second pin below an upper surface of the second substrate.

34. A method for producing an optical disk according to claim 32, wherein the second pin has a cylindrical shape, and the first pin is inserted into the second pin.

35. An apparatus for producing an optical disk including a first substrate in which a central hole A is formed and a second substrate in which a central hole B is formed, comprising:
a coating member for coating at least one substrate selected from the group consisting of the first substrate and the second substrate with radiation curable resin;
a disposing member for disposing the first substrate and the second substrate so that a center of the first substrate is aligned with a center of the second substrate; and
an irradiating member for irradiating the radiation curable resin with radiation.

36. An apparatus for producing an optical disk according to claim 35, wherein the disposing member includes a pin that fits in the first and second central holes A and B.

37. An apparatus for producing an optical disk according to claim 36, wherein the pin includes a first pin that fits in the central hole A and a second pin that fits in the central hole B.

38. An apparatus for producing an optical disk according to claim 37, wherein the second pin has a cylindrical shape, and the first pin is inserted into the second pin.

39. An apparatus for producing an optical disk according to claim 35, wherein the disposing member includes a table for fixing the at least one substrate.

40. An apparatus for producing an optical disk according to claim 39, wherein the disposing member further includes a container surrounding the table and an exhaust member for exhausting the container.

* * * * *